United States Patent
Hwang

[19]

[11] Patent Number: 6,052,217
[45] Date of Patent: Apr. 18, 2000

[54] THIN FILM ACTUATED MIRROR ARRAY AND METHOD FOR MANUFACTURING THE SAME

[75] Inventor: Kyu-Ho Hwang, Seoul, Rep. of Korea

[73] Assignee: Daewoo Electronics Co. Ltd., Seoul, Rep. of Korea

[21] Appl. No.: 09/106,017

[22] Filed: Jun. 29, 1998

[30] Foreign Application Priority Data

Jun. 30, 1997 [KR] Rep. of Korea ................. 97-28915

[51] Int. Cl.[7] ............................................ G02B 26/08
[52] U.S. Cl. ..................... 359/291; 359/295; 359/298; 359/318
[58] Field of Search ........................ 359/223, 224, 359/290, 291, 295, 298, 318

[56] References Cited

U.S. PATENT DOCUMENTS

| | | | |
|---|---|---|---|
| 5,469,302 | 11/1995 | Lim ........................................ | 359/291 |
| 5,663,830 | 9/1997 | Ji et al. ................................... | 359/291 |
| 5,691,836 | 11/1997 | Clark ...................................... | 359/247 |
| 5,757,539 | 5/1998 | Min ........................................ | 359/291 |
| 5,815,305 | 10/1998 | Min et al. .............................. | 359/292 |
| 5,835,256 | 11/1998 | Huibers ................................. | 359/291 |

*Primary Examiner*—Georgia Epps
*Assistant Examiner*—Margaret Burke
*Attorney, Agent, or Firm*—Pillsbury Madison & Sutro LLP

[57] ABSTRACT

Thin film AMA and method for manufacturing the thin film AMA are disclosed. The thin film AMA has an active matrix, a supporting member, actuating parts, a reflecting member, and a flatness enhancing member. The flatness enhancing member such as the stress balancing layer or the stiffening member is formed beneath the reflecting member in order to enhance the flatness of the reflecting member without a bending of the reflecting member. Therefore, the reflecting member can have the level surface by the flatness enhancing member though the deformation stress such as residual stress is generated in the reflecting member during forming the reflecting member, so the light efficiency is enhanced and the quality of the picture projected onto the screen is increased.

17 Claims, 18 Drawing Sheets

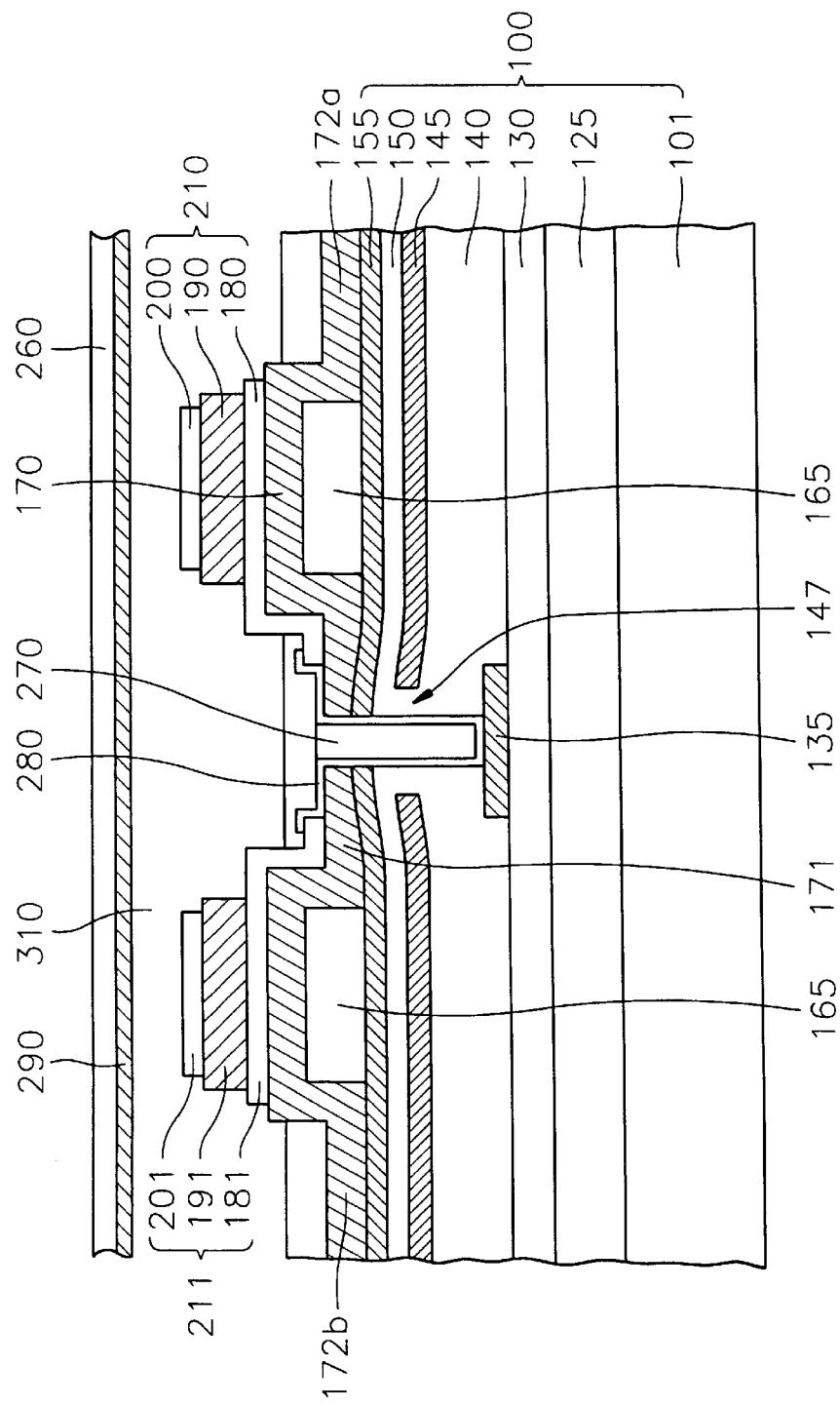

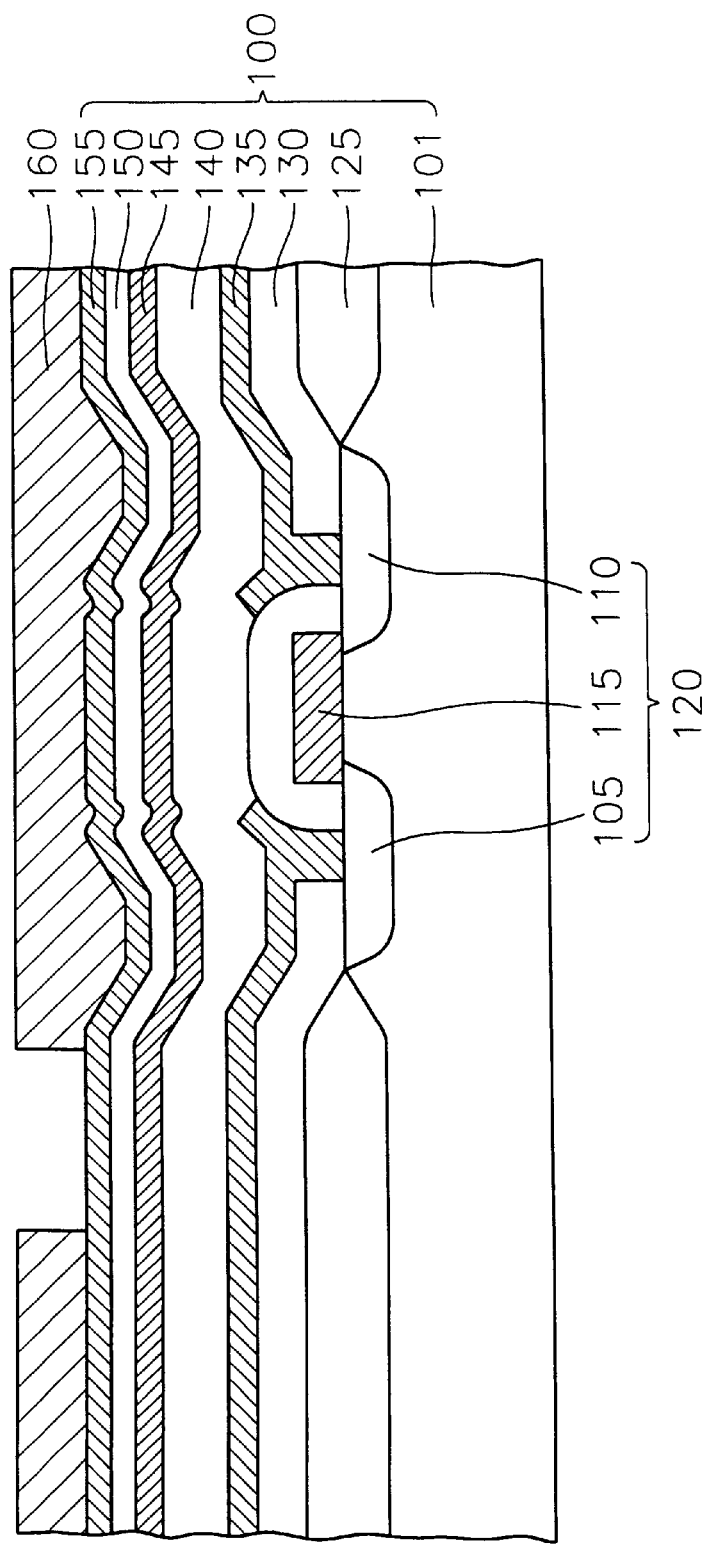

THIN FILM ACTUATED MIRROR ARRAY AND METHOD FOR MANUFACTURING THE SAME

BACKGROUND OF THE INVENTION

The present invention relates to a thin film actuated mirror array and more particularly to a thin film actuated mirror array having enhanced light efficiency by increasing the flatness of a reflecting member formed above actuating parts, and a method for manufacturing the same.

In general, light modulators are divided into two groups according to their optics. One type is a direct light modulator such as a cathode ray tube (CRT) and the other type is a transmissive light modulator such as a liquid crystal display (LCD). The CRT produces superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2% due to light polarization. Also, there are some problems in the liquid crystal materials of the LCD such as sluggish response and overheating.

Thus, a digital mirror device (DMD) and actuated mirror arrays (AMA) have been developed in order to solve these problems. At the present time, the DMD has a light efficiency of about 5% and the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

The AMA is generally divided into a bulk type AMA and a thin film type AMA. The bulk type AMA is disclosed in U.S. Pat. No. 5,469,302 (issued to Dae-Young Lim). In the bulk type AMA, after a ceramic wafer which is composed of a multilayer ceramic inserted into metal electrodes therein is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film AMA which is manufactured by using semiconductor technology has been developed.

The thin film AMA is disclosed in U.S. Pat. No. 5,815,305, dated Sep. 28, 1998, now U.S. Pat. No. 5,815,305 entitled "THIN FILM ACTUATED MIRROR ARRAY IN AN OPTICAL PROJECTION SYSTEM AND METHOD FOR MANUFACTURING THE SAME", is subject to an obligation to the assignee of this application.

FIG. 1 is a perspective view for showing the thin film AMA, FIG. 2 is a cross-sectional view taken along line $A_1$–$A_2$ of FIG. 1, and FIG. 3 is a cross-sectional view taken along line $B_1$–$B_2$ of FIG. 1.

Referring to FIGS. 1 and 2, the thin film AMA has a substrate 1, an actuator 90 formed on the substrate 1, and a reflecting member 80 installed on the actuator 90.

Referring to FIG. 2, the substrate 1 has an electrical wiring (not shown), a connecting terminal 5 formed on the electrical wiring, a passivation layer 10 formed on the substrate 1 and on the connecting terminal 5, and an etching stop layer 15 formed on the passivation layer 10. The electrical wiring and the connecting terminal 5 receive a first signal from outside and transmit the first signal. Preferably, the electrical wiring has a metal oxide semiconductor (MOS) transistor for switching operation. The passivation layer 10 protects the substrate 1 having the electrical wiring and the connecting terminal 5. The etching stop layer 15 prevents the passivation layer 10 and the substrate 1 from etching during subsequent etching steps.

The actuator 90 has a supporting layer 30 having a first portion attached to a portion of the etching stop layer 15 under which the connecting terminal 5 is formed and a second portion formed parallel to the etching stop layer 15, a bottom electrode 35 formed on the supporting layer 30, an active layer 40 formed on the bottom electrode 35, a top electrode 45 formed on the active layer 40, a common line 50 formed on the first portion of the supporting layer 30, and a post 75 formed on a portion of the top electrode 50. An air gap 25 is interposed between the etching stop layer 15 and the second portion of the supporting layer 30. The common line 50 is connected to the top electrode 50. The reflecting member 80 is supported by the post 75 so that the reflecting member 80 is formed parallel to the top electrode 50.

Referring to FIG. 3, the actuator 90 has a via contact 60 formed in a via hole 55 and a connecting member 70 formed from the via contact 60 to the bottom electrode 35. The via hole 55 is formed from a portion of the first portion of the supporting layer 30 to the connecting terminal 5. The bottom electrode 35 is connected to the via contact 60 via the connecting member 70. Therefore, the first signal, that is a picture signal, is applied to the bottom electrode 35 from outside through the electrical wiring, the connecting terminal 5, the via contact 60, and the connecting member 70. At the same time, when a second signal, that is a bias signal, is applied to the top electrode 45 from outside through the common line 50, an electric field is generated between the top electrode 45 and the bottom electrode 35. Thus, the active layer 40 formed between the top electrode 45 and the bottom electrode 35 is deformed by the electric field.

Preferably, the supporting layer 30 has a T-shape and the bottom electrode 35 has a rectangular shape. The bottom electrode 35 is formed on a central portion of the supporting layer 30. The active layer 40 has a rectangular shape which is smaller than the bottom electrode 35 and the top electrode 45 has a rectangular shape which is smaller than the active layer 40.

A method for manufacturing the thin film AMA will be described as follows.

FIGS. 4A and 4D illustrate the manufacturing steps of the thin film AMA in FIG. 2.

Referring to FIGS. 8A, at first, the substrate 1 having the electrical wiring (not shown) and the connecting terminal 5 is provided. Preferably, the substrate 1 is composed of a semiconductor such as silicon (Si). The connecting terminal 5 is formed by using tungsten (W). The connecting terminal 5 is connected to the electrical wiring. The electrical wiring and the connecting terminal 5 receive the first signal and transmit the first signal to the bottom electrode 35.

The passivation layer 10 is formed on the substrate 1 having the electrical wiring and the connecting terminal 5. The passivation layer 10 is formed by using phosphor-silicate glass (PSG). The passivation layer 10 is formed by a chemical vapor deposition (CVD) method so that the passivation layer 10 has a thickness of from 0.1 to 1.0 $\mu$m. The passivation layer 10 protects the substrate 1 including the electrical wiring and the connecting terminal 5 during subsequent manufacturing steps.

The etching stop layer 15 is formed on the passivation layer 10 by using nitride so that the etching stop layer 15 has a thickness of from 1000 to 2000 Å. The etching stop layer 15 is formed by a low pressure chemical vapor deposition (LPCVD) method. The etching stop layer 15 protects the passivation layer 10 and the substrate 1 during subsequent etching steps.

A first sacrificial layer 20 is formed on the etching stop layer 15 by using PSG so that the first sacrificial layer 20 has a thickness of from 0.5 to 2.0 $\mu$m. The first sacrificial layer 20 enables the actuator 90 to form easily. The first sacrificial layer 20 is removed by using a hydrogen fluoride (HF) vapor when the actuator 90 is completely formed. The first sacrificial layer 20 is formed by an atmospheric pressure CVD (APCVD) method. In this case, the degree of flatness of the first sacrificial layer 20 is poor because the first sacrificial layer 20 covers the top of the substrate 1 having the electrical wiring and the connecting terminal 5. Therefore, the surface of the first sacrificial layer 20 is planarized by using a spin on glass (SOG) or by a chemical mechanical polishing (CMP) method. Preferably, the surface of the first sacrificial layer 20 is planarized by the CMP method.

After a portion of the first sacrificial layer 20 having the connecting terminal 5 formed thereunder is patterned along the column direction in order to expose a portion of the etching stop layer 15, a first layer 29 is formed on the exposed portion of the etching stop layer 15 and on the first sacrificial layer 20. The first layer 29 is formed by using a rigid material, for example a nitride or a metal so that the first layer 29 has a thickness of from 0.1 to 1.0 $\mu$m. When the first layer 29 is formed by an LPCVD method, the ratio of nitride gas is adjusted according to the reaction time so as to release the stress in the first layer 29.

Referring to FIG. 4B, after a first photo-resist layer 32 is formed on the first layer 29 by a spin coating method, the first photo-resist 32 is patterned so as to expose a portion of the first layer 29 along the horizontal direction. As a result, a rectangular portion of first layer 29 which is adjacent to the connecting terminal 5 is exposed. After a bottom electrode layer is formed on the exposed portion of the first layer 29 and on the first photo-resist layer 32 by a sputtering method, the bottom electrode layer is patterned to form the bottom electrode 35 on the exposed portion of the first layer 29 considering the position on which the common line 50 will be formed. So, the bottom electrode 35 has a rectangular shape. The bottom electrode 35 is formed by using an electrically conductive metal such as platinum (Pt), tantalum (Ta) or platinum-tantalum (Pt-Ta) so that the bottom electrode 35 has a thickness of from 0.1 to 1.0 $\mu$m.

A second layer 39 is formed on the bottom electrode 35 and on the first photo-resist layer 32. The second layer 39 is formed by using a piezoelectric material such as PZT (Pb(Zr, Ti)O$_3$) or PLZT ((Pb, La)(Zr, Ti)O$_3$) so that the second layer 39 has a thickness of from 0.1 to 1.0 $\mu$m, preferably, about 0.4 $\mu$m. Also, the second layer 39 is formed by using an electrostrictive material such as PMN (Pb(Mg, Nb)O$_3$). The second layer 39 is formed by a sol-gel method, a sputtering method or a CVD method. Subsequently, the second layer 39 is annealed by a rapid thermal annealing (RTA) method. The second layer 39 will be patterned so as to form the active layer 40.

A top electrode layer 44 is formed on the second layer 39. The top electrode layer 44 is formed by using an electrically conductive metal such as aluminum (Al), platinum or tantalum. The top electrode layer 44 is formed by a sputtering method or a CVD method so that the top electrode layer 44 has a thickness of from 0.1 to 1.0 $\mu$m.

Referring to FIG. 4C, after a second photo-resist layer (not shown) is coated on the top electrode layer 44 by a spin coating method, the top electrode layer 44 is patterned so as to from the top electrode 45 having a rectangular shape by using the second photo-resist layer as an etching mask. Then, the second photo-resist layer is removed by striping. The second layer 39 is patterned by the same method as that of the top electrode layer 44. That is, after a third photo-resist layer (not shown) is coated on the top electrode 45 and on the second layer 39 by a spin coating method, the second layer 39 is patterned so as to form the active layer 40 by using the third photo-resist layer as an etching mask. The active layer 40 has a rectangular shape which is wider than that of the top electrode 45. In this case, the active layer 40 is smaller than the bottom electrode 35. Then, the third photo-resist layer is removed by striping.

The first layer 29 is patterned so as to form the supporting layer 30 by the above-described method. The supporting layer 30 has a T-shape which differs from that of the bottom electrode 35. The bottom electrode 35 is formed on the central portion of the supporting layer 30.

The common line 50 is formed on the first portion of the supporting layer 30 after the first photo-resist layer 32 is removed. Namely, after a fourth photo-resist layer (not shown) is coated on the supporting layer 30 by a spin coating method and then the fourth photo-resist is patterned to expose the first portion of the supporting layer 30, the common line 50 is formed on the exposed portion of the supporting layer 30 by using an electrically conductive metal such as platinum, tantalum, platinum-tantalum or aluminum. The common line 50 is formed by a sputtering method or a CVD method so that the common line 50 has a thickness of from 0.5 to 2.0 $\mu$m. At that time, the common line 50 is separated from the bottom electrode 135 by a predetermined distance and is attached to the top electrode 45 and to the active layer 40.

A portion of the first portion of supporting layer 30 having the connecting terminal 5 thereunder and a portion which is adjacent to the portion of the first portion of the supporting layer 30 are exposed when the fourth photo-resist is patterned. The via hole 55 is formed from the portion of the first portion of the supporting layer 30 to the connecting terminal 5 through the etching stop layer 15 and the passivation layer 10 by an etching. The via contact 60 is formed in the via hole 55 from the connecting terminal 5 to the supporting layer 30. At the same time, the connecting member 70 is formed on the portion which is adjacent to the portion of the first portion of the supporting layer 30 from the bottom electrode 35 to the via contact 60. Thus, the via contact 60, the connecting member 70, and the bottom electrode 35 are connected one after another. The via contact 60 and the connecting member 70 are formed by using an electrically conductive metal such as platinum, tantalum or platinum-tantalum. The connecting member 70 has a thickness of from 0.5 to 1.0 $\mu$m. Thus, the actuator 90 having the top electrode 45, the active layer 40, the bottom electrode 35 and the supporting layer 30, is completed after the fourth photo-resist is removed by etching.

Referring to FIG. 4D, after the first sacrificial layer 20 is removed by using a hydrogen fluoride vapor, a second sacrificial layer 85 is formed on the actuator 90 by using a polymer having a fluidity. The second sacrificial layer 85 is formed by a spin coating method so that the second sacrificial layer 85 covers the top electrode 45. Subsequently, the second sacrificial layer 85 is patterned to expose a portion of the top electrode 45. The post 75 is formed on the exposed portion of the top electrode 45 and the reflecting member 80 is formed on the post 75 and on the second sacrificial layer 85. The post 75 and the reflecting member 80 are simultaneously formed by using a reflective metal such as aluminum, platinum or silver. The post 75 and the reflecting member 80 are formed by a sputtering method or a CVD method. Preferably, the reflecting member 80 for reflecting a incident light from a light source (not shown) is a mirror and has a thickness of from 0.1 to 1.0 μm. The reflecting member 80 has a rectangular plate shape to cover the top electrode 45. The actuator 90 which the reflecting member 80 is formed thereon is completed as shown in FIGS. 1 and 2 after the second sacrificial layer 85 is removed by etching.

In the thin film AMA, the second signal is applied to the top electrode 45 through the common line 150 from outside. At the same time, the first signal is applied to the bottom electrode 35 through the electrical wiring, the connecting terminal 5, the via contact 60 and the connecting member 70 from outside. Thereby, an electric field is generated between the top electrode 45 and the bottom electrode 35. The active layer 40 formed between the top electrode 45 and the bottom electrode 35 is deformed by the electric field. The active layer 40 is deformed in the direction perpendicular to the electric field. The active layer 40 actuates in the direction opponent to the supporting layer 30. That is, the actuator 90 having the active layer 40 actuates upward by a predetermined tilting angle.

The reflecting member 80 for reflecting the incident light from the light source is tilted with the actuator 90 because the reflecting member 80 is supported by the post 75 and is formed on the actuator 90. Hence, the reflecting member 80 reflects the light onto the screen, so the picture is projected onto the screen.

However, in the above-described thin film AMA, the flatness of the reflecting member is lowered due to the deformation stress generated in the reflecting member for forming the reflecting member, so the light efficiency of the light incidented from the light source is decreased. That is, when the metal layer is deposited on the second sacrificial layer and patterned to form the reflecting member, the reflecting member may be bent upward or downward because of the deformation stress such as a residual stress caused by a compressive stress or a tensile stress for forming and patterning the metal layer, so the flatness of the reflecting member is lowered. As a result, the quality of the picture projected onto the screen is deteriorated according as the light efficiency of the reflecting member is decreased.

SUMMARY OF THE INVENTION

Accordingly, considering the conventional problems as described above, it is a first object of the present invention to provide a thin film actuated mirror array increasing the light efficiency by a level reflecting member, so the quality of a picture projected onto a screen is increased.

It is a second object of the present invention to provide a method for manufacturing a thin film actuated mirror array increasing the light efficiency by a level reflecting member, so the quality of a picture projected onto a screen is increased.

To accomplish the first object, there is provided in the present invention a thin film actuated mirror array having an active matrix, a supporting member, a first actuating part, a second actuating part, a reflecting member, and a flatness enhancing member. The active matrix has a substrate including a metal oxide semiconductor transistor installed therein for switching operation and a first metal layer having a drain pad prolonged from a drain of the metal oxide semiconductor for transmitting the first signal. A first passivation layer is formed on the first metal layer and on the substrate, a second metal layer is formed on the first passivation layer, a second passivation layer is formed on the second metal layer, and an etching stop layer is formed on the second passivation layer.

The supporting member has a supporting line formed above the active matrix, a supporting layer integrally formed with the supporting line and a plurality of anchors respectively formed between the active matrix and portions of the supporting layer adjacent to the supporting line.

The first actuating part has a first bottom electrode formed at a first portion of the supporting layer which is formed perpendicular to the supporting line, a first top electrode corresponding to the first bottom electrode, and a first active layer formed between the first bottom electrode and the first top electrode. The second actuating part also has a second bottom electrode formed at a second portion of the supporting layer formed perpendicular to the supporting line, a second top electrode corresponding to the second bottom electrode, and a second active layer formed between the second bottom electrode and the second top electrode. The first bottom electrode has a reverse L-shape, the first active layer has a rectangular shape smaller than the first bottom electrode, the first top electrode has a rectangular shape smaller than the first active layer, the second bottom electrode has an L-shape corresponding to the first bottom electrode, the second active layer has a rectangular shape smaller than the second bottom electrode, and the second top electrode has a rectangular shape smaller than the second active layer. A via contact is formed from the drain pad to the first bottom electrode and the second bottom electrode, a common line is formed on the supporting line, a first insulating member is formed from a portion of the first top electrode to a portion of the supporting layer through a portion of the first bottom electrode, a first top electrode connecting member is formed from the common line to the first top electrode through the first insulating layer, a second insulating member is formed from a portion of the second top electrode to a portion of the supporting layer through a portion of the second bottom electrode, and a second top electrode connecting member is formed from the common line to the second top electrode through the second insulating layer.

The reflecting member is formed above the first actuating part and the second actuating part.

The flatness enhancing member for enhancing the flatness of the reflecting member is formed beneath the reflecting member. The flatness enhancing member is a stress balancing layer formed beneath the reflecting member or a stiffening member formed beneath peripheral portions of the reflecting member. The stress balancing layer is preferably composed of a nitride and the stiffening member is composed of the same metal of the reflecting member. The stiffening member has a shape which four bars are arranged as a rectangular shape. The stiffening member also has a shape of X, a shape of a sharp or a shape of a diamond.

To accomplish the second object, there is provided in the present invention a method for manufacturing a thin film actuated mirror array comprising the steps of:

i) providing an active matrix having a substrate including a metal oxide semiconductor therein for switching operation, and a first metal layer including a drain pad prolonged form a drain of the metal oxide transistor;

ii) forming a first sacrificial layer on the active matrix and patterning the first sacrificial layer;

iii) forming a first layer, a bottom electrode layer, a second layer, and a top electrode layer on the patterned first sacrificial layer one after another;

iv) forming a first actuating part including a first bottom electrode, a first active layer and a first top electrode, and a second actuating part including a second bottom electrode, a second active layer and a second top electrode by patterning the top electrode layer, by patterning the second layer, and by patterning the bottom electrode layer;

v) forming a supporting member having a supporting line, a supporting layer, and a plurality of anchors by patterning the first layer;

vi) forming a common line on the supporting line;

vii) forming a second sacrificial layer on the first actuating part, on the second actuating part and on the supporting member, and patterning the second sacrificial layer;

viii) forming a flatness enhancing member on the patterned second sacrificial layer; and ix) forming a reflecting member on the flatness enhancing member.

The step viii) is performed by using a nitride and by a plasma enhanced chemical vapor deposition method. The step viii) and the step ix) are simultaneously performed and the patterned second sacrificial layer has a shape of which four bars are arranged as a rectangular shape, a shape of X, a shape of a sharp or a shape of a diamond after patterning the second sacrificial layer.

In the thin film AMA according to the present invention, the first signal is applied from outside to the first and the second bottom electrodes through the transistor, the drain pad, and the via contact. At the same time, the second signal is applied from outside to the first and the second top electrodes through the common line and the first and the second top electrode connecting members. Thus, a first electric field is generated between the first top electrode and the first bottom electrode and a second electric field is generated between the second top electrode and the second bottom electrode. The first active layer formed between the first top electrode and the first bottom electrode is deformed by the first electric field and the second active layer formed between the second top electrode and the second bottom electrode is deformed by the second electric field. The first and the second active layers are respectively deformed in the directions perpendicular to the first and the second electric fields. The first actuating part having the first active layer and the second actuating part having the second active layer are actuated in the opponent direction to the position where the supporting layer is located. That is, the first and the second actuating parts are actuated upward and the supporting layer attached to the first and the second bottom electrodes is also actuated upward according to the actuatings of the first and the second actuating parts.

The reflecting member reflecting the incident light from a light source is tilted with the first and the second actuating parts. Hence, the reflecting member reflects the light onto the screen, so the picture is projected on the screen.

In the thin film AMA according to the present invention, the flatness enhancing member such as the stress balancing layer or the stiffening member is formed beneath the reflecting member in order to enhance the flatness of the reflecting member without bending of the reflecting member. Therefore, the reflecting member can have the level surface by the flatness enhancing member though the deformation stress such as residual stress is generated in the reflecting member during a formation of the reflecting member, so the light efficiency is enhanced and the quality of the picture projected onto the screen is increased.

BRIEF DESCRIPTION OF THE DRAWINGS

The above objects and advantages of the present invention will become more apparent by describing in detail preferred embodiments thereof with reference to the attached drawings, in which:

FIG. 8 is a cross-sectional view taken along line $D_1$–$D_2$ of FIG. 6;

FIGS. 9A to 9G illustrate manufacturing steps of the thin film actuated mirror array according to the first embodiment of the present invention;

DETAILED DESCRIPTION OF THE INVENTION

Hereinafter, the preferred embodiments of the present invention will be explained in more detail with reference to the accompanying drawings.

Embodiment 1

Figure 1:
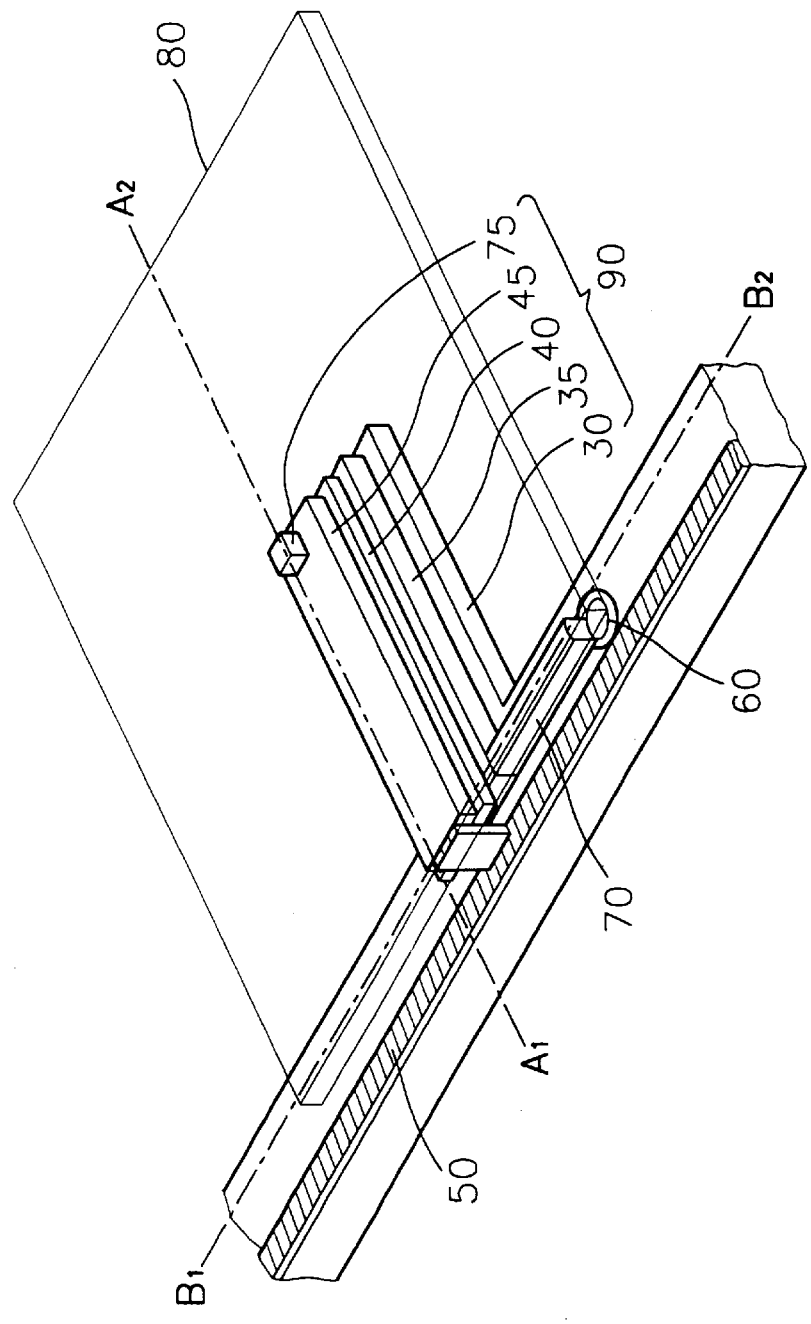
FIG. 1 is a perspective view for showing a thin film actuated mirror array disclosed in a prior application of the assignee of this application.
Figure 2:
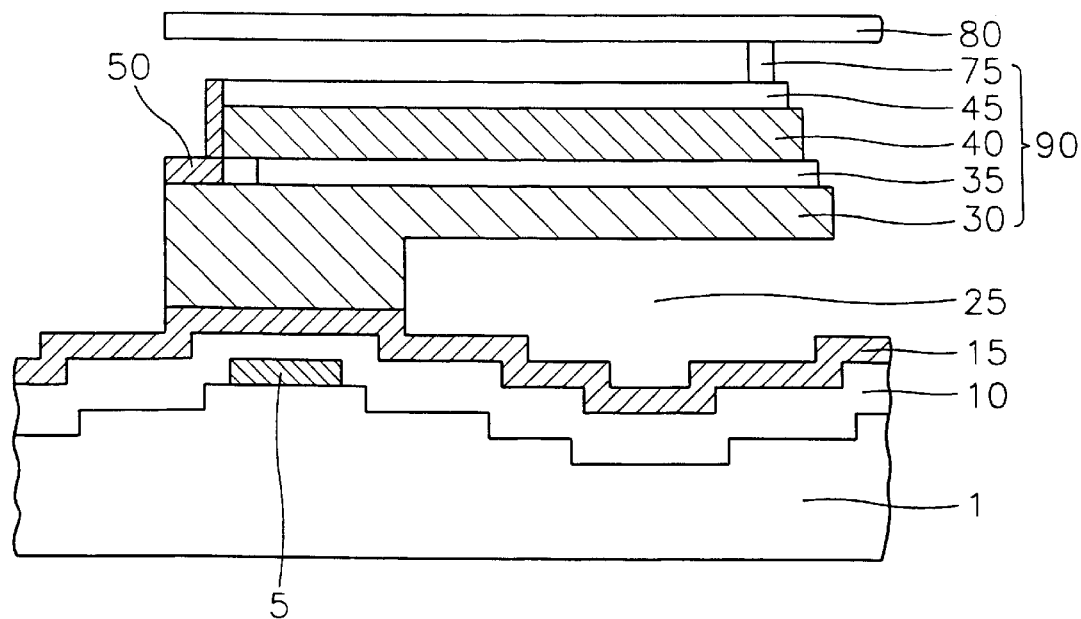
FIG. 2 is a cross-sectional view taken along line $A_1$–$A_2$ of FIG. 1.
Figure 3:
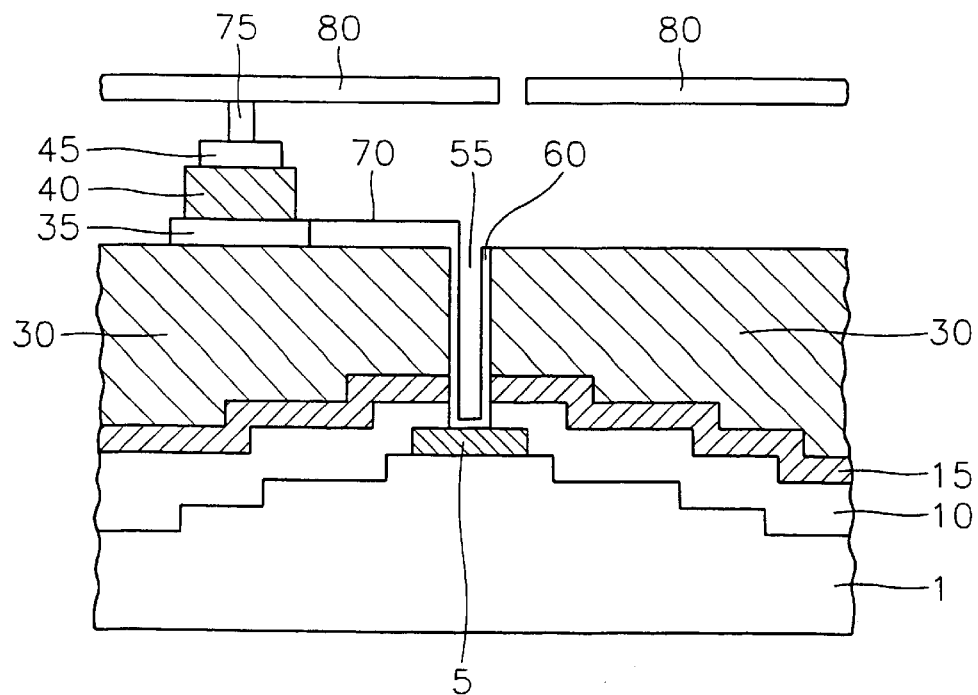
FIG. 3 is a cross-sectional view taken along line $B_1$–$B_2$ of FIG. 1.
Figure 4A:
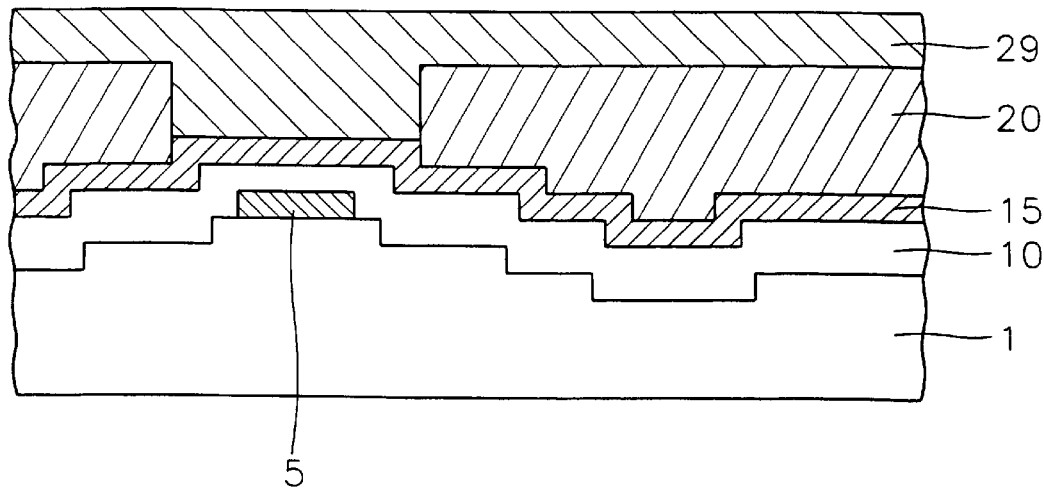
FIGS. 4A to 4D illustrate manufacturing steps of the thin film actuated mirror array in FIG. 2.
Figure 4B:
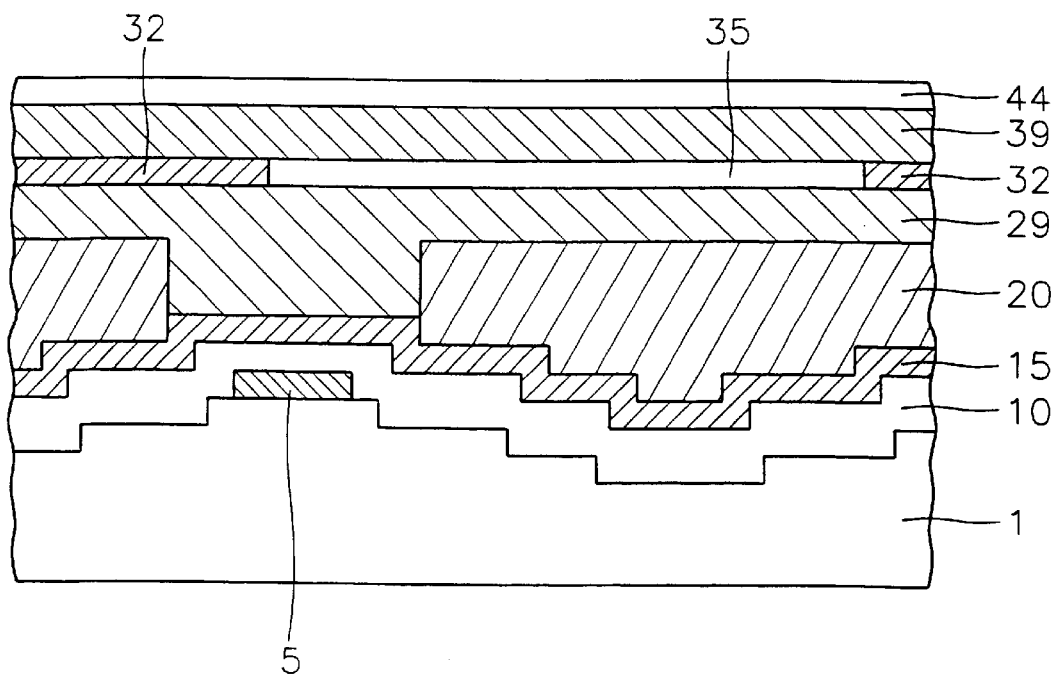
Figure 4C:
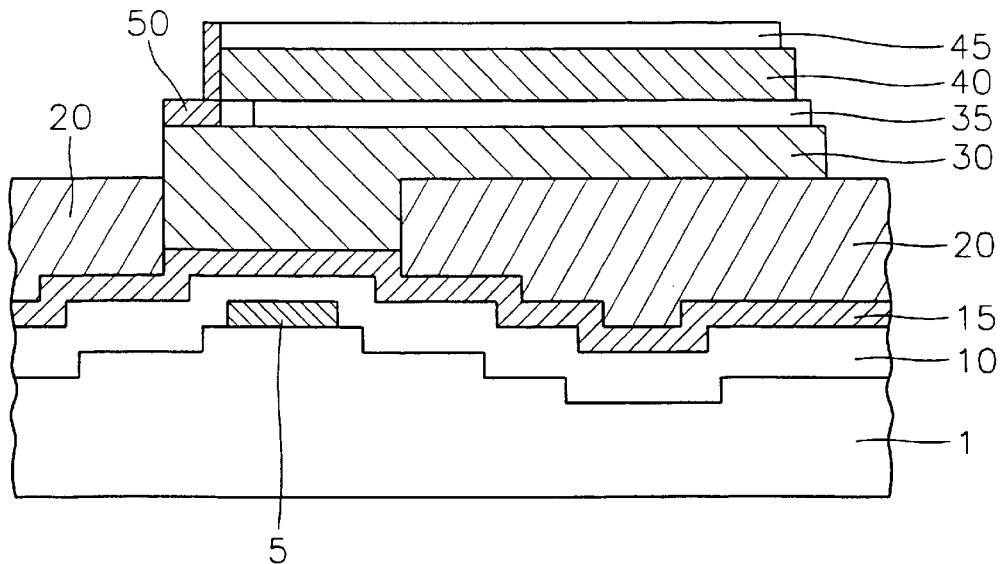
Figure 4D:
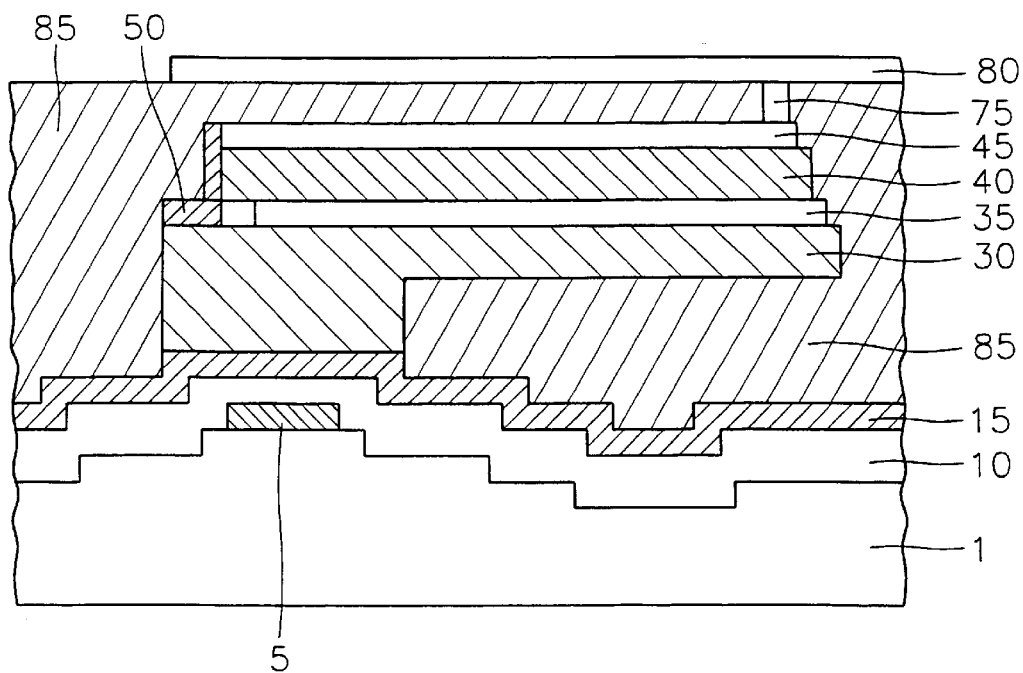
Figure 5:
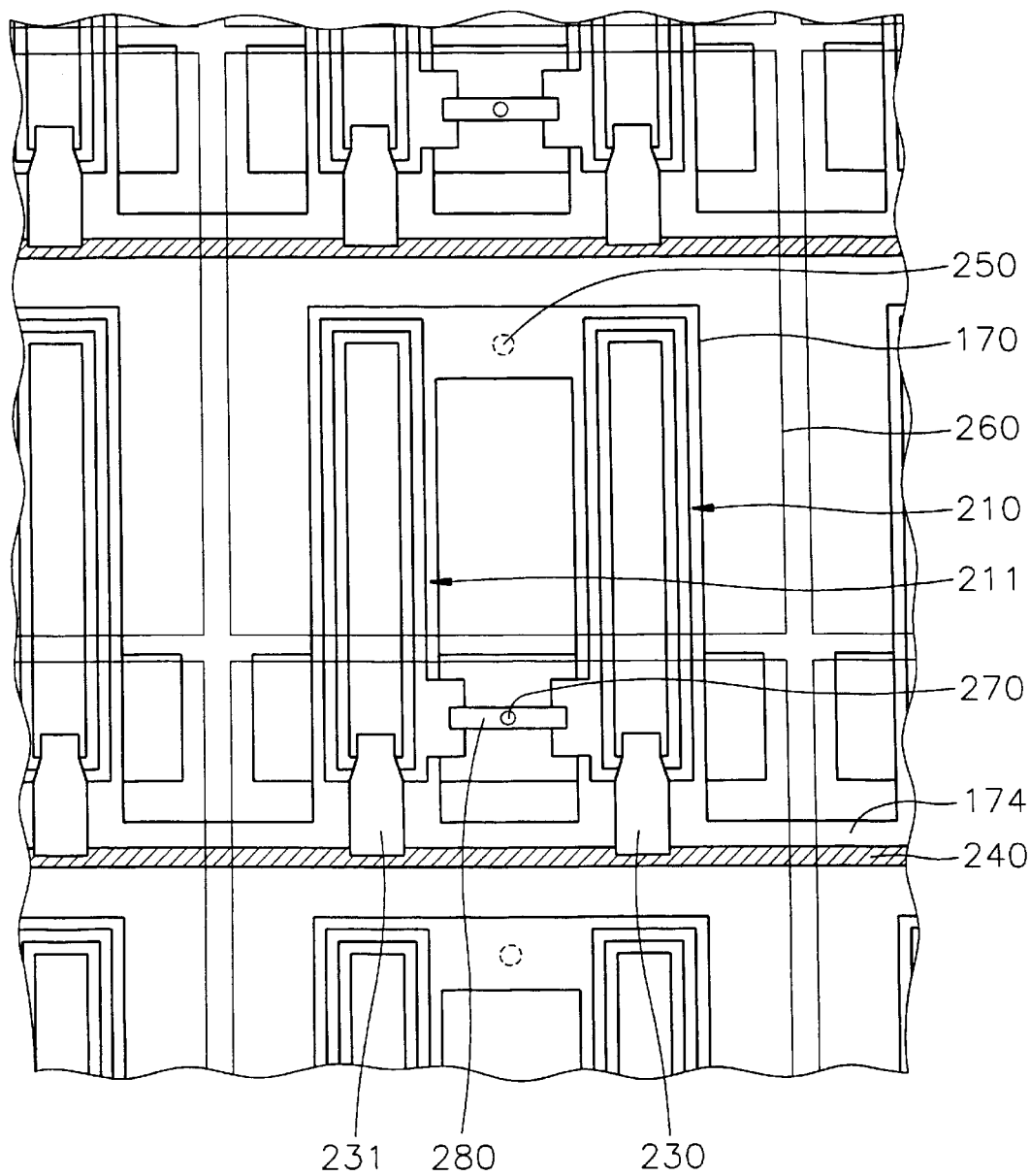
FIG. 5 is a plan view for showing a thin film actuated mirror array according to a first embodiment of the present invention.
Figure 6:
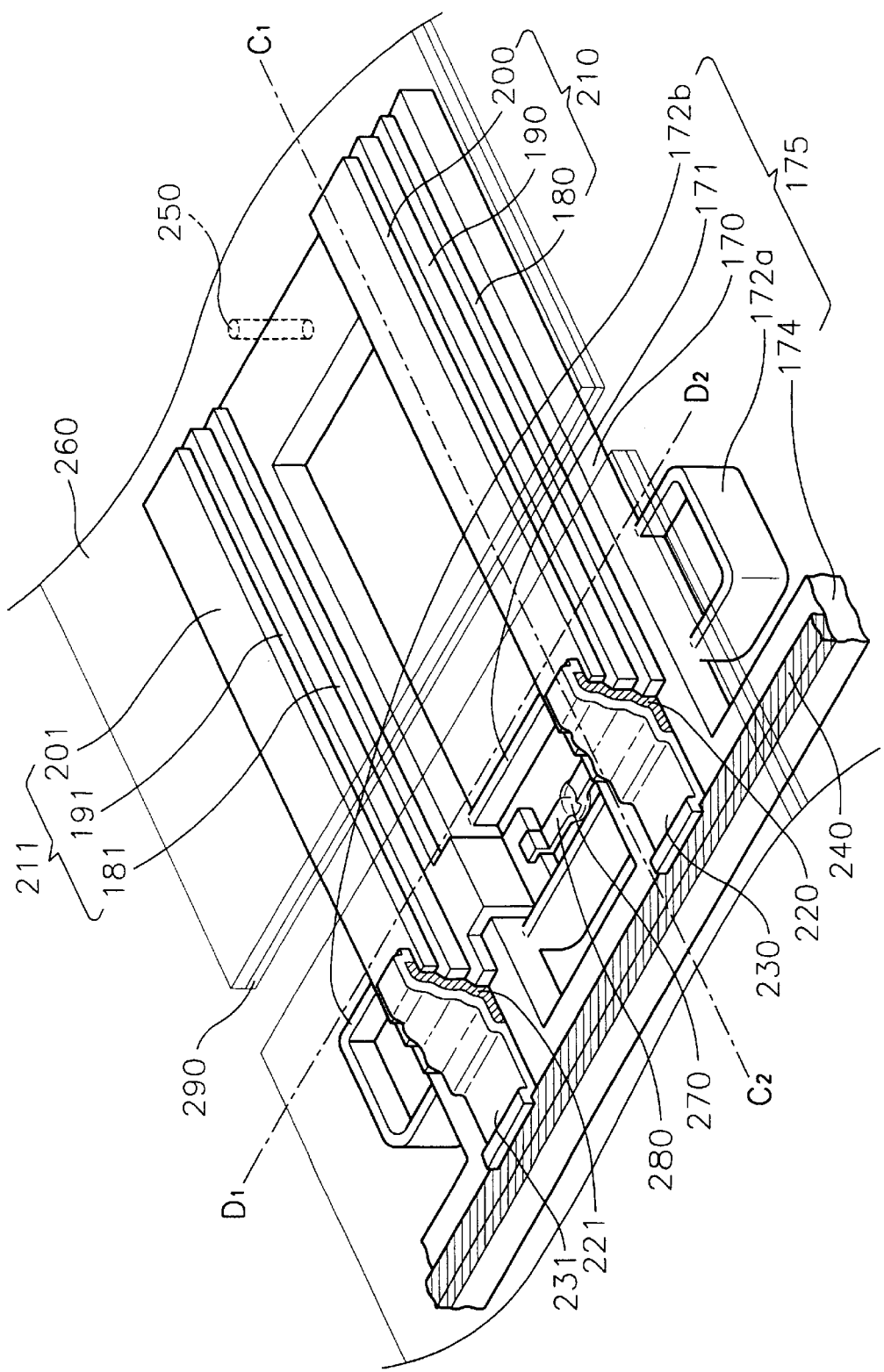
FIG. 6 is a perspective view for showing the thin film actuated mirror array in FIG. 5.
Figure 7:
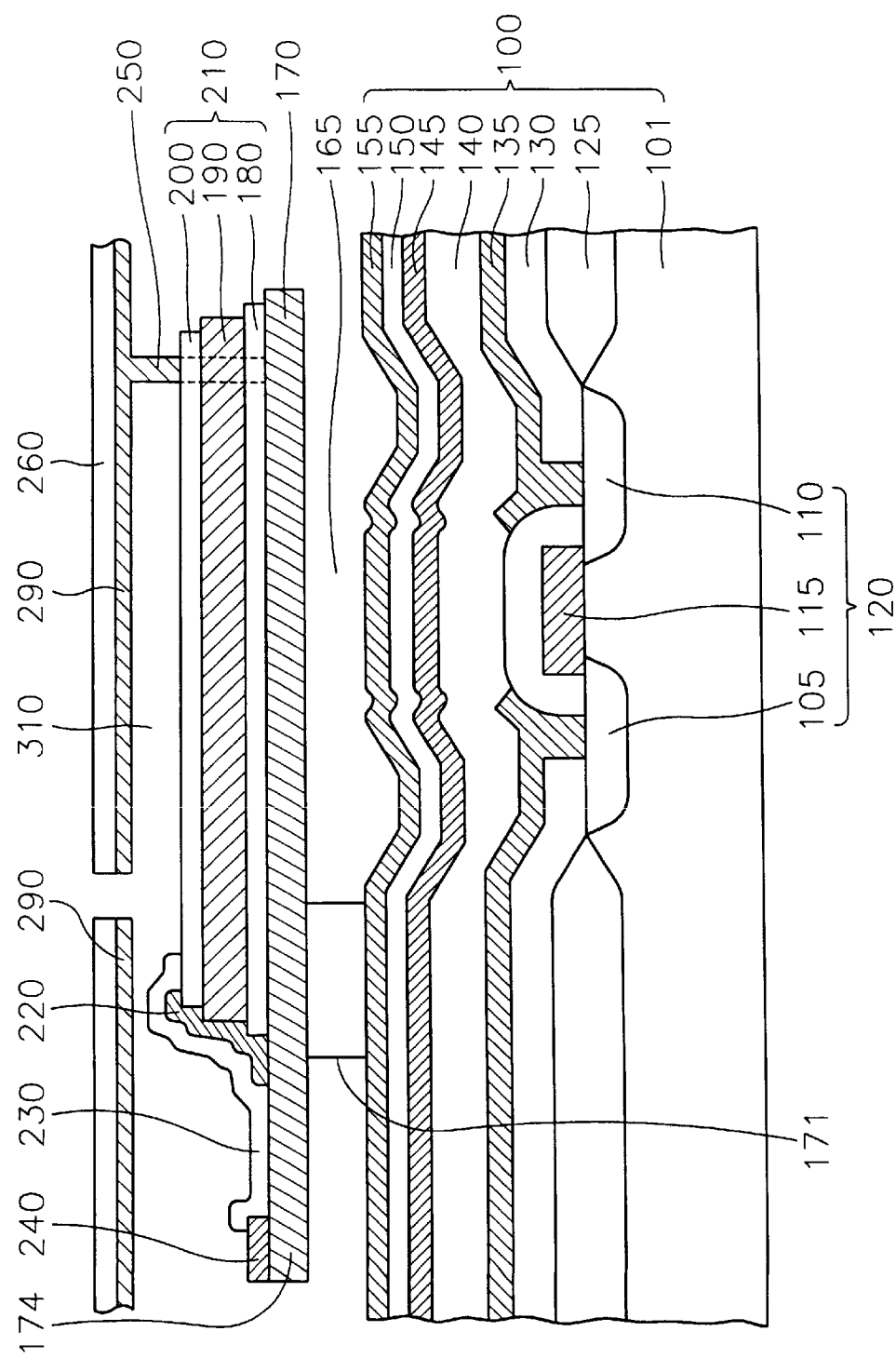
FIG. 7 is a cross-sectional view taken along line $C_1$–$C_2$ of FIG. 6.

FIG. 5 is a plan view for showing a thin film actuated mirror array according to a first embodiment of the present invention, FIG. 6 is a perspective view for showing the thin film actuated mirror array in FIG. 5, FIG. 7 is a cross-sectional view taken along line $C_1$–$C_2$ of FIG. 6, and FIG. 9 is a cross-sectional view taken along line $D_1$–$D_2$ of FIG. 6.

Referring to FIGS. 5 and 7, the thin film AMA according to the present embodiment has an active matrix 100, a supporting member 175 formed on the active matrix 100, a first actuating part 210 and a second actuating part 211 respectively formed on the supporting member 175, a reflecting member 260 formed above the first actuating part 210 and above the second actuating part 211, and a flatness enhancing member 290 formed beneath the reflecting member 260.

Referring to FIG. 7, the active matrix 100 has a substrate 101 including M×N (M, N are integers) numbers of P-MOS transistors 120, a first metal layer 135 prolonged from a source 110 and from a drain 105 of the P-MOS transistor 120, a first passivation layer 140, a second metal layer 145, a second passivation layer 150, and an etching stop layer 155. The first metal layer 135 is formed on the substrate 101 and the first passivation layer 140 is formed on the first metal layer 135 and on the substrate 101. The second metal layer 145 is formed on the first passivation layer 140 and the second passivation layer 150 is formed on the second metal layer 145. The etching stop layer 155 is formed on the second passivation layer 150.

For transmitting a first signal (picture signal), the first metal layer 135 has a drain pad prolonged from the drain 105 of the P-MOS transistor 120 to a first anchor 171 which is formed beneath and between the first actuating part 210 and the second actuating part 211. The second metal layer 145 includes a titanium layer and a titanium nitride layer. A hole 147 is formed at a portion of the second metal layer 145 having the drain pad of the first metal layer 135 formed thereunder.

Referring to FIGS. 6 and 8, the supporting member 175 has a supporting line 174, a supporting layer 170, the first anchor 171 and two second anchors 172a, 172b. The supporting line 174 and the supporting layer 170 are formed above the etching stop layer 155. A first air gap 165 is interposed between the etching stop layer 155 and the supporting line 174. The first air gap 165 is also interposed between the etching stop layer 155 and the supporting layer 170.

A common line 240 is formed on the supporting line 174. The supporting line 174 supports the common line 240. The supporting layer 170 has a rectangular ring shape. The supporting layer 170 is integrally formed with the supporting line 174.

The first anchor 171 is formed beneath and between two arms of the rectangular ringshaped supporting layer 170. These two arms of the supporting layer 170 are perpendicularly prolonged from the supporting line 174. The first anchor 171 is attached to a first portion of the etching stop layer 155 having the drain pad of the first metal layer 135 formed thereunder. The first anchor 171 is integrally formed with those two arms of the supporting layer 170. The two second anchors 172a, 172b are respectively formed beneath lateral portions of those two arms of the supporting layer 170. The second anchors 172a, 172b are also integrally formed with those two arms of the supporting layer 170. The second anchors 172a, 172b are respectively attached to a second portion of the etching stop layer 155 and to a third portion of the etching stop layer 155. The first anchor 171 and the two second anchors 172a, 172b are attached beneath portions of the supporting layer 170 which are adjacent to the supporting line 174. The first anchor 171 and the second anchors 172a, 172b together support the supporting layer 170, so the first anchor 171 and the second anchors 172a, 172b support the first actuating part 210 and the second actuating part 211. The first anchor 171 and the second anchors 172a, 172b respectively have box-shapes.

A central portion of the supporting layer 170 is supported by the first anchor 171 and lateral portions of the supporting layer 170 are supported by the second anchors 172a, 172b.

A via hole 270 is formed from the surface of the first anchor 171 to the drain pad of the first metal layer 135 through portions of the etching stop layer 155, the second passivation layer 150, the hole 147 of the second metal layer 145, and the first passivation layer 140.

The first actuating part 210 and the second actuating part 211 are respectively formed on those two arms of the supporting layer 170. The first actuating part 210 and the second actuating part 211 are formed parallel to each other. The first actuating part 210 has a first bottom electrode 180, a first active layer 190, and a first top electrode 200. The second actuating part 211 has a second bottom electrode 181, a second active layer 191, and a second top electrode 201.

The first bottom electrode 180 is formed on one of those two arms of the supporting layer 170. The first bottom electrode 180 has a rectangular shape including a protruding portion. Preferably, the first bottom electrode 180 has an inversed L shape. The first bottom electrode 180 is apart from the supporting line 174 by a predetermined interval. The protruding portion of the first bottom electrode 180 is prolonged downward like stairs. The protruding portion of the first bottom electrode 180 is prolonged to a portion of the first anchor 171 adjacent to the via hole 270. The first active layer 190 is formed on the first bottom electrode 180. The first active layer 190 has a rectangular shape which is smaller than the first bottom electrode 180. The first top electrode 200 is formed on the first active layer 190. The first top electrode 200 has a rectangular shape which is smaller than the first active layer 190.

The second bottom electrode 181 is formed on the other of those two arms of the supporting layer 170. The second bottom electrode 181 has a rectangular shape having a protruding portion, preferably, the second bottom electrode 181 has an L shape corresponding to the first bottom electrode 180. The second bottom electrode 181 is also apart from the supporting line 174 by a predetermined interval. The protruding portion of the second bottom electrode 181 is prolonged to a portion of the first anchor 171 adjacent to the via hole 270 such as the protruding portion of the first bottom electrode 180. Hence, these protruding portions of the first and the second bottom electrodes 180, 181 are correspondingly formed centering around the via hole 270. The second active layer 191 is formed on the second bottom electrode 181. The second active layer 191 has a rectangular shape which is smaller than the second bottom electrode 181. The second top electrode 201 is formed on the second active layer 191. The second top electrode 201 has a rectangular shape which is smaller than the second active layer 191.

The via contact 280 is formed from the drain pad of the first metal layer 135 to the protruding portion of the first bottom electrode 180 and to the protruding portion of the second bottom electrode 181 through the via hole 270. Thus, the first bottom electrode 180 and the second bottom electrode 181 are connected to the drain pad of the first metal layer 135 through the via contact 280.

A first insulating member 220 is formed from a portion of the first top electrode 200 to a portion of the supporting layer 170 which is adjacent the supporting line 174. A first top electrode connecting member 230 is formed from a portion of the first top electrode 200 to the common line 240 through the first insulating member 220. The first top electrode connecting member 230 connects the first top electrode 200 to the common line 240. The first insulating member 220 prevents the first top electrode 200 from connecting to the first bottom electrode 180, so the first insulating member 220 prevents an electrical short from occurring between the first top electrode 200 and the first bottom electrode 180.

Also, a second insulating member 221 is formed from a portion of the second top electrode 201 to a portion of the supporting layer 170 which is adjacent the supporting line A second top electrode connecting member 231 is formed from a portion of the second top electrode 201 to the common line 240 through the second insulating member 221. The second top electrode connecting member 231 connects the second top electrode 201 to the common line 240. The second insulating member 221 and the second top electrode connecting member 231 are respectively formed parallel to the first insulating layer 220 and the first top electrode connecting member 230. The second insulating member 221 prevents the second top electrode 201 from connecting to the second bottom electrode 181, so the second insulating member 221 prevents an electrical short from generating between the second top electrode 201 and the second bottom electrode 181.

The post 250 is formed at a portion of the supporting layer 170 having the rectangular ring shape on which the first actuating part 210 and the second actuating part 211 are not formed. That is, a portion of the supporting layer 170 is separate in parallel direction from the supporting line 174. The post 250 supports the reflecting member 260 which reflects the incident light from a light source (not shown). Preferably, the reflecting member 260 has a rectangular shape. The flatness enhancing member 290 is formed beneath the reflecting member 260. The flatness enhancing member 290 enhances the flatness of the reflecting member 260 to increase the light efficiency of reflecting member 260, so the quality of the picture projected onto a screen (not shown) is enhanced.

In the present embodiment, the flatness enhancing member 290 is a stress balancing layer which has the same shape as the reflecting member 260. The stress balancing layer and the post 250 are simultaneously formed by using a nitride such as silicon nitride ($Si_3N_4$).

Central portions of reflecting member 260 and the flatness enhancing member 290 are supported by the post 250. Lateral portions of the reflecting member 260 and the flatness enhancing member 290 are parallely formed above the first actuating part 210 and above the second actuating part 211. A second air gap 310 is interposed between a lateral portion of the flatness enhancing member 290 and the first and the second actuating parts 210, 211. The reflecting member 260 is tilted according as the first actuating part 210 and the second actuating part 211 are actuated, so the reflecting member 260 reflects the incident light from the light source by a predetermined angle.

A method for manufacturing the thin film AMA in an optical projection system according to the present invention will be described as follows.

FIGS. 9A to 9G illustrate manufacturing steps of the thin film AMA according to the present embodiment. In FIGS. 9A to 9G, the same reference numerals are used for the same elements in FIG. 7.

Referring to FIG. 9A, an isolating layer 125 is formed on the substrate 101 in order to separate an active region and a field region in the substrate 101 by local oxidation of silicon method after the substrate 101 composed of silicon is provided. Preferably, the substrate 101 is an N-typed silicon wafer. Subsequently, M×N (M and N are integers) numbers of P-typed metal oxide semiconductor (MOS) transistors 120 are completed according as the P+ source 110 and the P+ drain 105 are formed on the active region after a gate 115 is formed between the source 110 and the drain 105. The P-MOS transistor 120 receives the first signal from outside and performs a switching operation.

After an insulating layer 130 is formed on the substrate 101 having the P-MOS transistor 120 formed therein, openings are respectively formed at portions of the insulating layer 130 having drain 105 and the source 110 formed thereunder so as to expose the portions of the drain 105 and the source 110. After a layer composed of titanium (Ti), titanium nitride (TiN), tungsten (W), and a nitride is formed on the insulating layer 130 having the openings, the layer is patterned to form the first metal layer 135. To transmit the first signal, the first metal layer 135 has a drain pad prolonged from the drain 105 of the P-MOS transistor 120 to the first anchor 171.

The first passivation layer 140 is formed on the first metal layer 135 and on the substrate 101. The first passivation layer 140 is formed by using phosphor-silicate glass (PSG). The first passivation layer 140 is formed by chemical vapor deposition (CVD) method so that the first passivation layer 140 has a thickness of from 8000 to 9000 Å. The first passivation layer 140 protects the substrate 101 having the P-MOS transistor 120 during subsequent manufacturing steps.

The second metal layer 145 is formed on the first passivation layer 140. The second metal layer 145 is composed of a titanium layer and a titanium nitride layer. For forming the second metal layer 145, at first, the titanium layer is formed on the first passivation layer 140 by sputtering method so that the titanium layer has a thickness of from 300 to 500 Å. Next, the titanium nitride layer is formed on the titanium layer by physical vapor deposition (PVD) method so that the titanium nitride layer has a thickness of from 1000 to 1200 Å. The second metal layer 145 excludes the light incident upon the substrate 101, so the second metal layer 145 prevents a photo leakage current from flowing through the substrate 101. Then, a portion of the second metal layer 145 having the drain pad formed thereunder is etched so as to form the hole 147. The hole 147 isolates the via contact 280 from the second metal layer 145.

The second passivation layer 150 is formed on the second metal layer 145. The second passivation layer 150 is formed by using PSG. The second passivation layer 150 is formed by CVD method so that the second passivation layer 150 has a thickness of from 2000 to 3000 Å. The second passivation layer 150 protects the second metal layer 145 and the resultant layers formed on the substrate 101 during subsequent manufacturing steps.

The etching stop layer 155 is formed on the second passivation layer 150 by using a low temperature oxide (LTO) such as silicon dioxide ($SiO_2$) or phosphorus pentoxide ($P_2O_5$). The etching stop layer 155 is formed by low pressure CVD (LPCVD) method under a temperature of from 350 to 450° C. so that the etching stop layer 155 has a thickness of from 0.2 to 0.8 $\mu$m. The etching stop layer 155 protects the second passivation layer 150 and the resultant layers formed on the substrate 101 during subsequent etching steps. As a result, the active matrix 100 is completed, which is composed of the substrate 101, the first metal layer 135, the first passivation layer 140, the second metal layer 145, the second passivation layer 150, and the etching stop layer 155.

A first sacrificial layer 160 is formed on the etching stop layer 155 by using poly silicon below a temperature of about 500° C. The first sacrificial layer 160 is formed by LPCVD method so that the first sacrificial layer 160 has a thickness of from 2.0 to 3.0 $\mu$m. In this case, the degree of flatness of the first sacrificial layer 160 is poor because the first sacrificial layer 160 covers the top of the active matrix 100 having the MOS transistor 120 and the resultant layers. Therefore, the surface of the first sacrificial layer 160 is planarized by using spin on glass (SOG) or by chemical mechanical polishing (CMP) method so that the first sacrificial layer 160 has a thickness of about 1.1 $\mu$m.

Figure 9B:
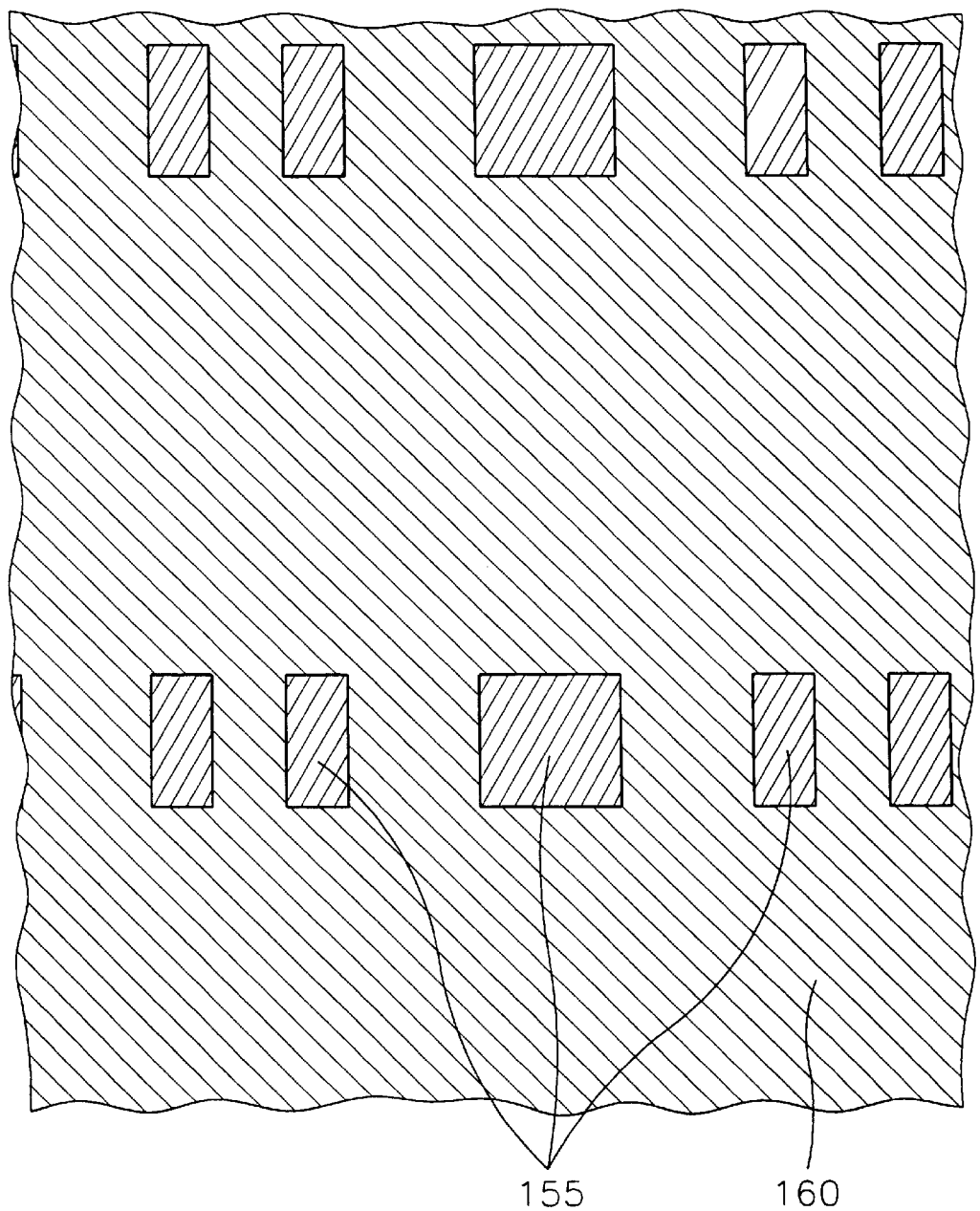

FIG. 9B illustrates a plan view for showing the patterned first sacrificial layer 160.

Referring to FIGS. 9A and 9B, after a first photo resist (not shown) is coated on the first sacrificial layer 160 and is patterned, a first portion of the first sacrificial layer 160 having the hole 147 of the second metal layer 145 formed thereunder and a second and a third portion of the first sacrificial layer 160 adjacent to the first portion are etched to expose portions of the etching stop layer 155. The first anchor 171 and the second anchors 172a, 172b will be formed at the exposed portions of the etching stop layer 155. These exposed portions of the etching stop layer 155 respectively have rectangular shapes which are separated by predetermined intervals. Then, the first photo resist is removed.

Figure 9C:
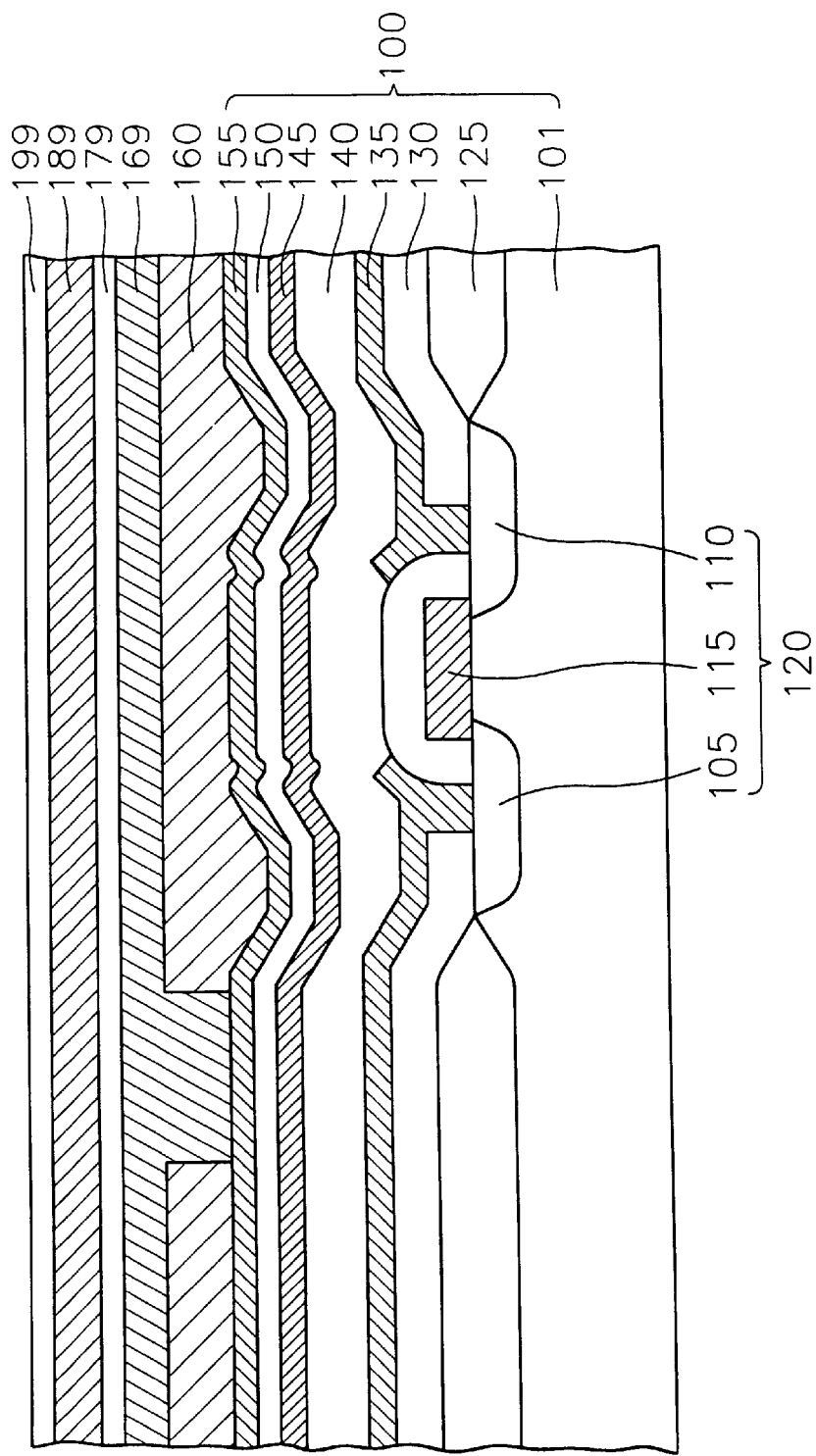

Referring to FIG. 9C, a first layer 169 is formed on those exposed portions of the etching stop layer 155 which have rectangular shapes and on the first sacrificial layer 160. The first layer 169 is formed by using a rigid material such as nitride or metal. The first layer 169 is formed by LPCVD method so that the first layer 169 has a thickness of from 0.1 to 1.0 μm. The first layer 169 will be patterned so as to form the supporting member 175 having the supporting layer 170, the supporting line 174, the first anchor 171 and the two second anchors 172a, 172b. At that time, the first anchor 171 is located at the center of the exposed portions of the etching stop layer 155 and two second anchors 172a, 172b are respectively located at other exposed portions of the etching stop layer 155.

A bottom electrode layer 179 is formed on the first layer 169. The bottom electrode layer 179 is formed by using electrically conductive metal such as platinum (Pt), tantalum (Ta) or platinum-tantalum (Pt-Ta). The bottom electrode layer 179 is formed by sputtering method or CVD method so that the bottom electrode layer 179 has a thickness of from 0.1 to 1.0 μm. The bottom electrode layer 179 will be patterned to form the first bottom electrode 180 and the second bottom electrode 181 respectively having the protruding portions which are opposed to each other.

A second layer 189 is formed on the bottom electrode layer 179. The second layer 189 is formed by using piezoelectric material such as PZT (Pb(Zr, Ti)O$_3$) or PLZT ((Pb, La)(Zr, Ti)O$_3$) and by sol-gel method, sputtering method, spin coating method or CVD method so that the second layer 189 has a thickness of from 0.1 to 1.0 μm. Preferably, the second layer 189 is formed by the spin coating method and by using the PZT produced according to the sol-gel method so that the second layer 189 has a thickness of about 0.4 μm. Then, the second layer 189 is annealed by rapid thermal annealing (RTA) method. The second layer 189 will be patterned to form the first active layer 190 and the second active layer 191.

A top electrode layer 199 is formed on the second layer 189. The top electrode layer 199 is formed by using an electrically conductive metal, for example, tantalum, platinum or silver (Ag). The top electrode layer 199 is formed by sputtering method or CVD method so that the top electrode layer 199 has a thickness of from 0.1 to 1.0 μm. The top electrode layer 199 will be patterned so as to form the first top electrode 200 and the second top electrode 201 which are separated by a predetermined interval.

Figure 9D:
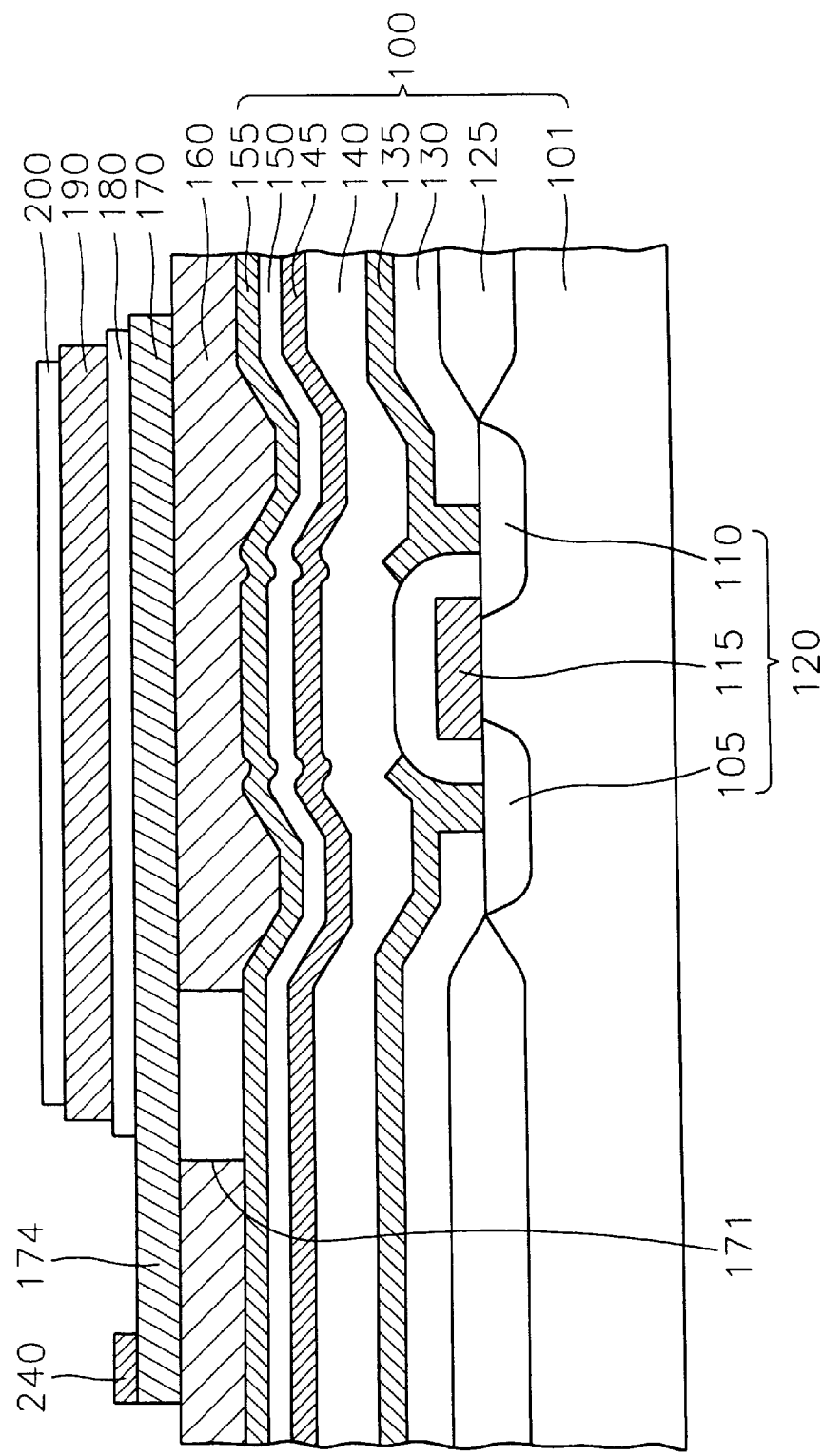

Referring to FIG. 9D, after a second photo resist (not shown) is coated on the top electrode layer 199 by spin coating method, the top electrode layer 199 is patterned so as to form the first top electrode 200 and the second top electrode 201 which respectively have rectangular shapes (see FIG. 6) by using the second photo resist as an etching mask. The first top electrode 200 and the second top electrode 201 are formed parallel to each other. A second signal (bias signal) is applied to the first top electrode 200 and to the second top electrode 201 through the common line 240. Then, the second photo resist is removed.

The second layer 189 is patterned to form the first active layer 190 and the second active layer 191 by the same process of the top electrode layer 199. The first active layer 190 and the second active layer 191 are also formed parallel to each other. In this case, the first active layer 190 and the second active layer 191 respectively have rectangular shapes which are wider than the first top electrode 200 and the second top electrode 201 as shown in FIG. 6.

The bottom electrode layer 179 is patterned to form the first bottom electrode 180 and the second bottom electrode 181 by the same process of the top electrode layer 199. The first bottom electrode 180 and the second bottom electrode 181 respectively have the rectangular shapes which correspondingly have the protruding portions. Preferably, the first bottom electrode 180 has the inversed L shape and the second bottom electrode 181 has the L shape corresponding to the first bottom electrode 180. The first bottom electrode 180 and the second bottom electrode 181 are respectively wider than the first active layer 190 and the second active layer 191.

When the first bottom electrode 180 and the second bottom electrode 181 are formed, the common line 240 is simultaneously formed at a portion of the first layer 169 which will be patterned to form the supporting line 174. The common line 240 is formed in the direction perpendicular to the first bottom electrode 180 and the second bottom electrode 181 as shown in FIG. 6. The common line 240 is separated from the first and the second bottom electrodes 180, 181 by a predetermined interval, so the common line 240 does not contact with the first bottom electrode 180 and with the second bottom electrode 181. As a result, the first actuating part 210 and the second actuating part 211 are completed.

Subsequently, the first layer 169 is patterned to form the supporting member 175 having the supporting layer 170, the supporting line 174, the first anchor 171 and the two second anchors 172a, 172b. In this case, among the first layer 169 attached to the exposed portions of the etching stop layer 155, the first anchor 171 is located at the center of the exposed portion of the etching stop layer 155 and two second anchors 172a, 172b respectively locate on the other exposed portions of the etching stop layer 155. The hole 147 of the second metal layer 145 is formed under the first anchor 171. The supporting layer 170 has the rectangular ring shape and is integrally formed with the supporting line 174 which is formed above the etching stop layer 155. The supporting member 175 is completed as shown in FIG. 6 when the first sacrificial layer 160 is removed.

The first anchor 171 is formed beneath and between those two arms of the rectangular ring-shaped supporting layer 170. Two arms of the supporting layer 170 are perpendicularly prolonged from the supporting line 174. The first anchor 171 is attached to the center of the exposed portion of the etching stop layer 155, a first exposed portion of the etching stop layer 155, having the drain pad of the first metal layer 135 formed thereunder. The first anchor 171 is integrally formed with two arms of the supporting layer 170. The two second anchors 172a, 172b are respectively formed beneath outsides of two arms of the supporting layer 170. The second anchors 172a, 172b are also integrally formed with two arms of the supporting layer 170 and are respectively attached to the second and the third exposed portions of the etching stop layer 155. The first anchor 171 and the second anchors 172a, 172b are respectively attached beneath the portions of the supporting layer 170 which are adjacent to the supporting line 174. The first actuating part 210 and the second actuating part 211 are respectively formed on two arms of the supporting layer 170. Hence, the first anchor 171 is formed beneath and between the first actuating part 210 and the second actuating part 211 and the second anchors 172a, 172b are respectively formed beneath lateral portions of the first and the second actuating parts 210, 211. The first anchor 171 and the second anchors 172a, 172b together support the supporting layer 170, so the first anchor 171 and the second anchors 172a, 172b support the first actuating part 210 and the second actuating part 211.

Figure 9E:
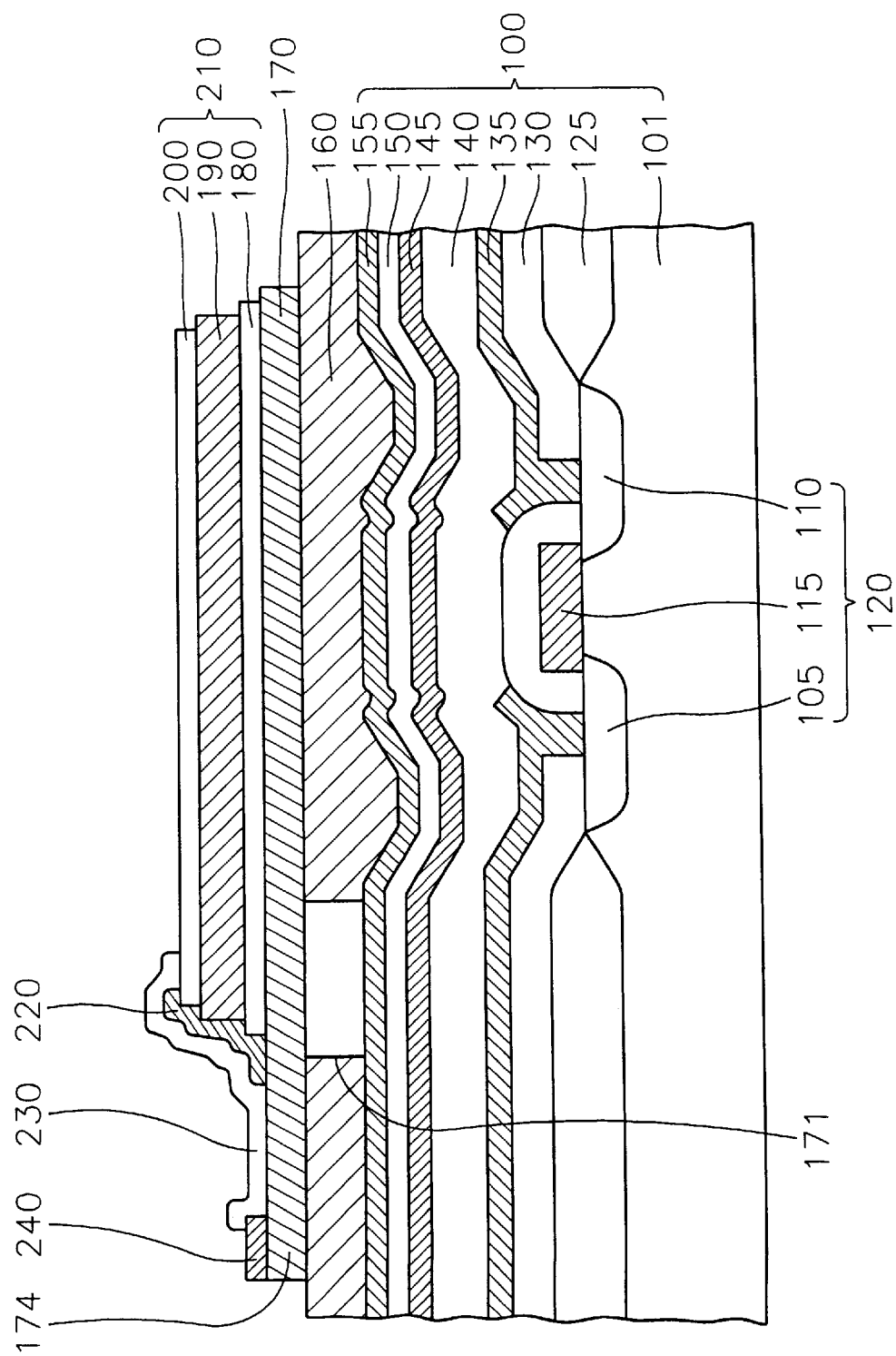

Referring to FIG. 9E, after a third photo resist (not shown) is coated on the supporting member 175, on the first actuating part 210, and on the second actuating part 211, the third photo resist is patterned to expose portions of the common line 240, the supporting member 175, the first top electrode 200, and the second top electrode 201. At that time, the protruding portions of the first bottom electrode 180 and the second bottom electrode 181 are simultaneously exposed.

Subsequently, the first insulating member 220 and the second insulating member 221 are formed by patterning LTO such as silicon dioxide or phosphorus pentoxide, after the LTO is formed on the exposed portions of the supporting member 175, the first top electrode 200, and the second top electrode 201 by LPCVD method. The first insulating member 220 is formed from a portion of the first top electrode 200 to a portion of the supporting layer 170 through portions of the first active layer 190 and the first bottom electrode 180. The second insulating member 221 is also formed from a portion of the second top electrode 200 to a portion of the supporting layer 170 through portions of the second active layer 190 and the second bottom electrode 180. The first insulating member 220 and the second insulating member 221 respectively have thicknesses of from 0.2 to 0.4 $\mu$m.

Figure 9F:
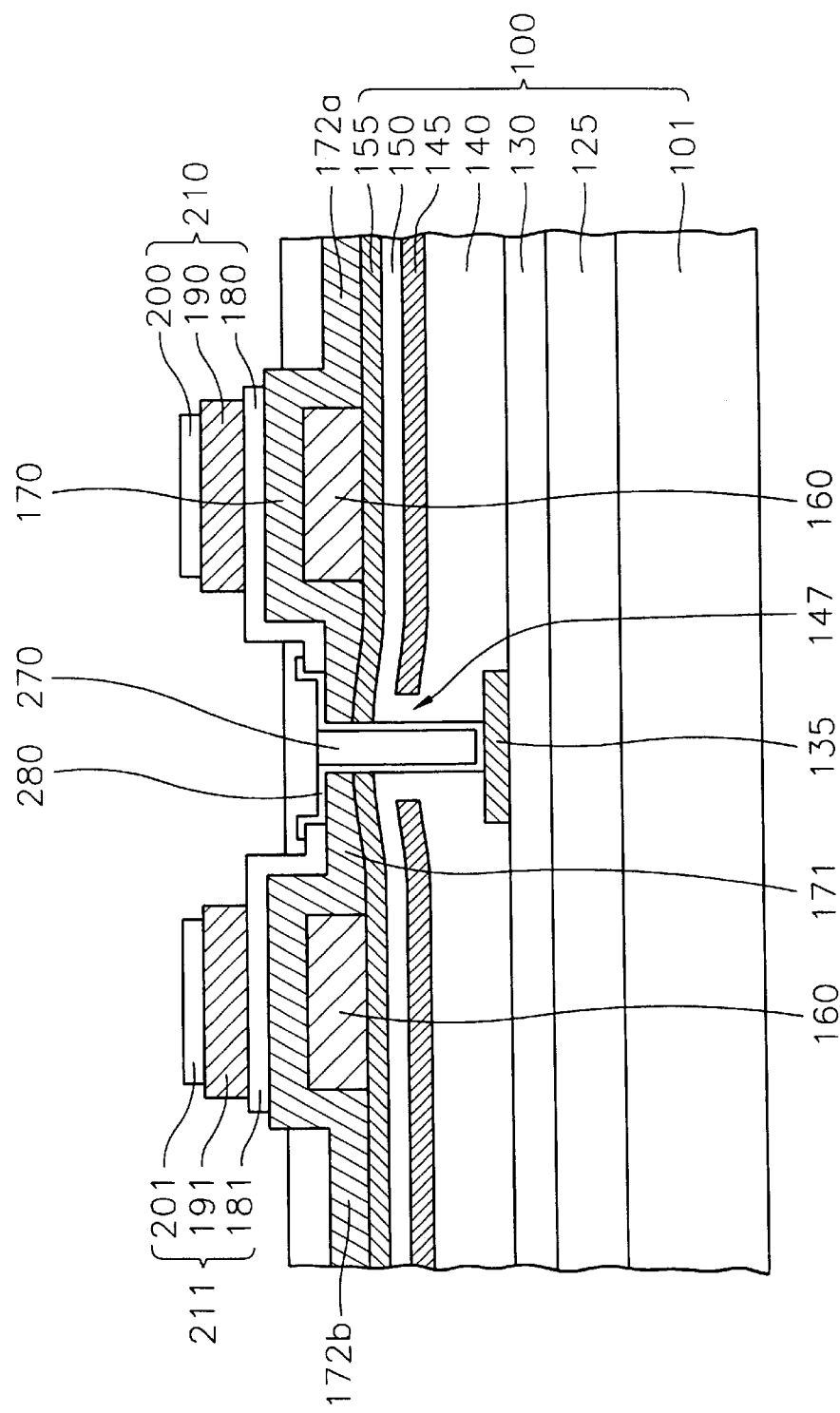

FIG. 9F illustrates a cross-sectional view for showing the via contact 280. Referring to FIG. 9F, the via hole 270 is formed from the first anchor 171 to the drain pad of the first metal layer 135 through the hole 147 of the second metal layer 145 by etching portions of the etching stop layer 155, the second passivation layer 150, and the first passivation layer 140. Then, the via contact 280 is formed from the drain pad of the first metal layer 135 to the protruding portions of the first and the second bottom electrodes 180, 181 through the via hole 270. Hence, the first bottom electrode 180 and the second bottom electrode 181 are connected to the drain pad through the via contact 280. At the same time, the first top electrode connecting member 230 is formed from the common line 240 to a portion of the first top electrode 200 via the first insulating member 220 and the supporting layer 170. The second top electrode connecting member 231 is also formed from the common line 240 to a portion of the second top electrode 201 via the second insulating member 221 and the supporting layer 170 as shown in FIG. 6. The first top electrode connecting member 230 and the second top electrode connecting member 231 are formed parallel to each other.

The via contact 280, the first top electrode connecting member 230 and the second top electrode connecting member 231 are formed by using electrically conductive metals such as platinum, tantalum, or platinum-tantalum and by sputtering method or CVD method. The via contact 280, the first top electrode connecting member 230 and the second top electrode connecting member 231 respectively have thicknesses of from 0.1 to 0.2 $\mu$m. The first top electrode connecting member 230 and the second top electrode connecting member 231 respectively connect the common line 240 to the first top electrode 200 and to the second top electrode 201.

Figure 9G:
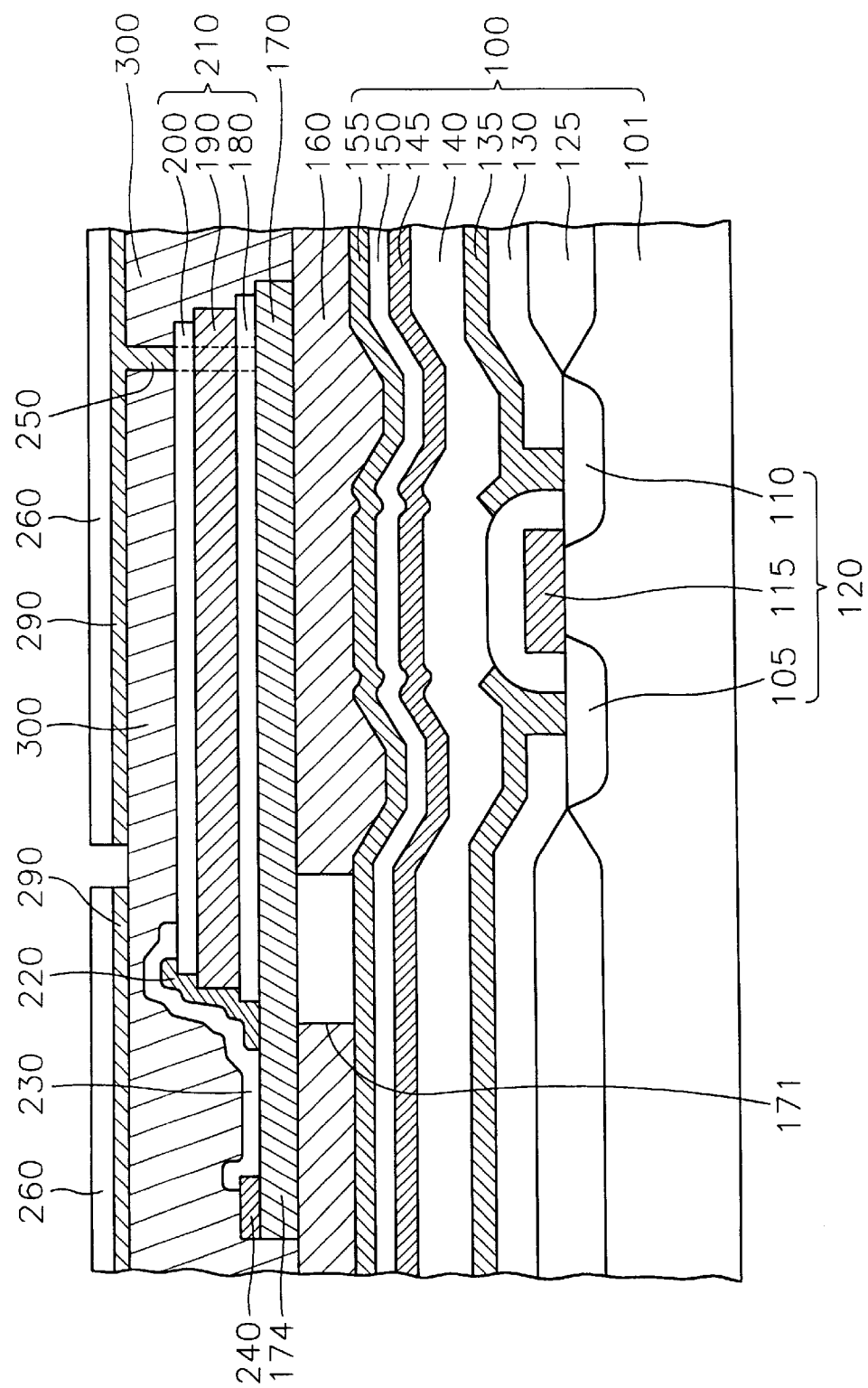

Referring to FIG. 9G, a second sacrificial layer 300 is formed on the first actuating part 210, on the second actuating part 211 and on the supporting member 175. The second sacrificial layer 300 is formed by using poly-silicon and by LPCVD method. The second sacrificial layer 300 sufficiently covers the first actuating part 210 and the second actuating part 211. Then, the surface of the second sacrificial layer 300 is planarized by CMP method so that the second sacrificial layer 300 has an even surface.

Subsequently, a portion of the second sacrificial layer 300 is etched to expose a portion of the supporting layer 170 which is apart in parallel direction to the supporting line 174.

Namely, the portion of the supporting layer 170 where the first actuating part 210 and the second actuating part 211 are not formed is exposed. The post 250 and the flatness enhancing member 290 (the stress balancing layer) are simultaneously formed by patterning a nitride such as silicon nitride after the nitride having a thickness of from about 0.1 to about 1.0 $\mu$m is formed on the exposed portion of the supporting layer 170 and on the sacrificial layer 300 by plasma enhanced chemical vapor deposition method (PECVD). Then, the surface of the flatness enhancing member 290 is planarized by CMP method so as to have a level surface. The flatness enhancing member 290 prevents the bending or the distortion of the reflecting member 260 while the reflecting member 260 is formed.

The reflecting member 260 is formed on the flatness enhancing member 290 by patterning a metal layer having reflectivity such as aluminum, platinum, silver or aluminum alloy after the metal layer is formed on the flatness enhancing member 290 by sputtering method or CVD method. The reflecting member 260 and the flatness enhancing member 290 have rectangular shapes each of which has the same size. Central portions of the reflecting member 260 and the flatness enhancing member 290 are supported by the post 250 and lateral portions of the reflecting member 260 and flatness enhancing member 290 are parallely formed above the first actuating part 210 and above the second actuating part 211.

Therefore, the thin film AMA shown in FIG. 6 is complete by rinsing and drying after the first sacrificial layer 160 and the second sacrificial layer 300 are removed by using bromine fluoride ($BrF_3$ or $BrF_5$) vapor or xenon fluoride ($XeF_2$, $XeF_4$ or $XeF_6$) vapor. A second air gap 310 is formed at the position where the second sacrificial layer 300 is located and the first air gap 165 is formed at the position where the first sacrificial layer 160 is located.

The operation of the thin film AMA according to the present embodiment will be described.

In the thin film AMA according to the present embodiment, the first signal is applied from outside to the first and the second bottom electrodes 180, 181 through the MOS transistor 120, the drain pad, and the via contact 280. At the same time, the second signal is applied from outside to the first and the second top electrodes 200, 201 through the common line 240 and the first and the second top electrode connecting members 230, 231. Thus, a first electric field is generated between the first top electrode 200 and the first bottom electrode 180 and a second electric field is generated between the second top electrode 201 and the second bottom electrode 181. The first active layer 190 formed between the first top electrode 200 and the first bottom electrode 180 is deformed by the first electric field and the second active layer 191 formed between the second top electrode 201 and the second bottom electrode 181 is deformed by the second electric field. The first and the second active layers 190, 191 are respectively deformed in the directions perpendicular to the first and the second electric fields. The first actuating part 210 having the first active layer 190 and the second actuating part 211 having the second active layer 191 are actuated in the opposite direction to the position where the supporting layer 170 is located. That is, the first and the second actuating parts 210, 211 are actuated upward and the supporting layer 170 attached to the first and the second bottom electrodes 180, 181 are also actuated upward according to the actuatings of the first and the second actuating parts 210, 211.

The reflecting member 260 reflecting the incident light from the light source is tilted with the first and the second actuating parts 210, 211. Hence, the reflecting member 260 reflects the light onto the screen, so the picture is projected on the screen.

Embodiment 2

Figure 10:
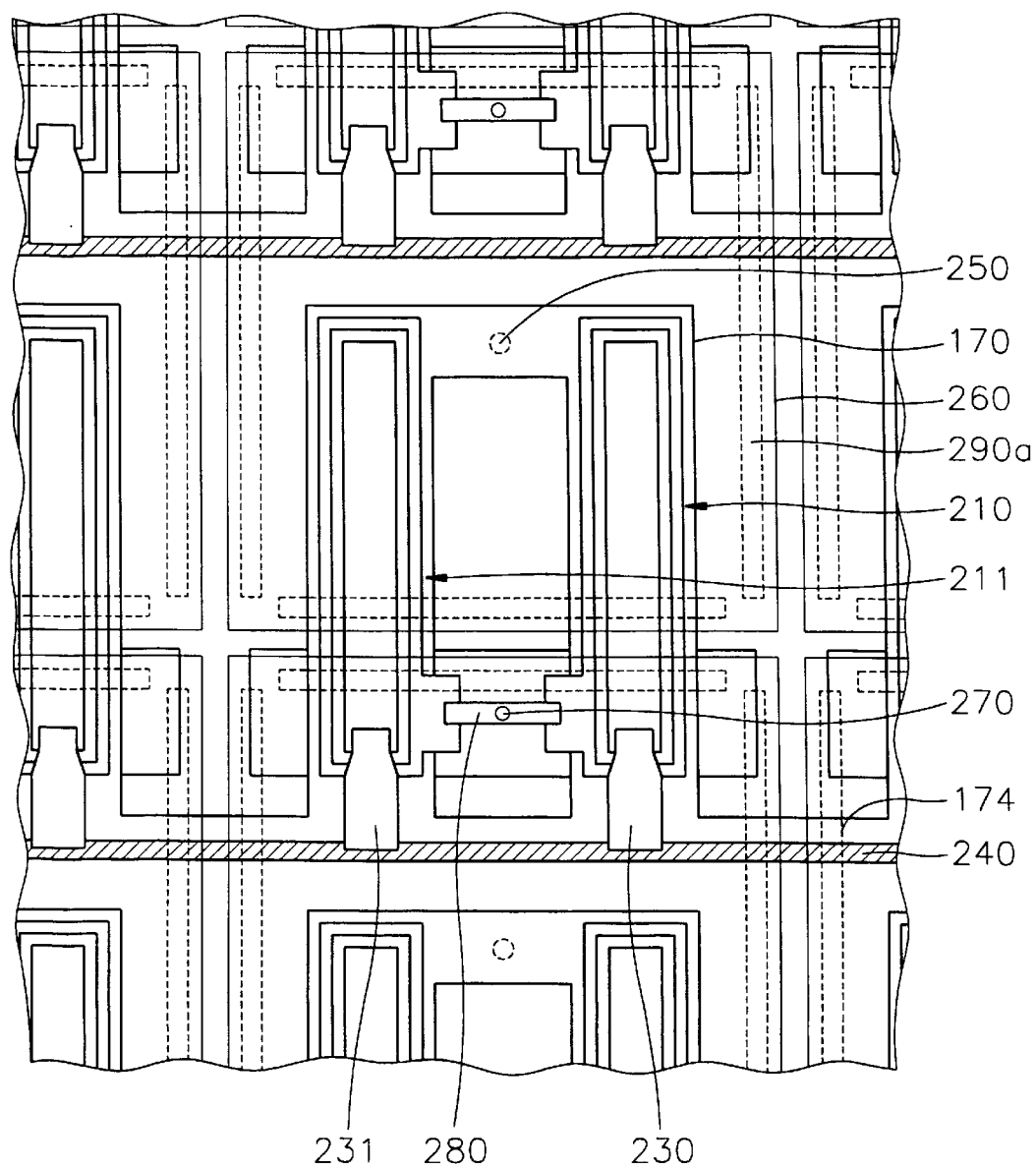
FIG. 10 is a plan view for showing a thin film actuated mirror array according to a second embodiment of the present invention.
Figure 11A:
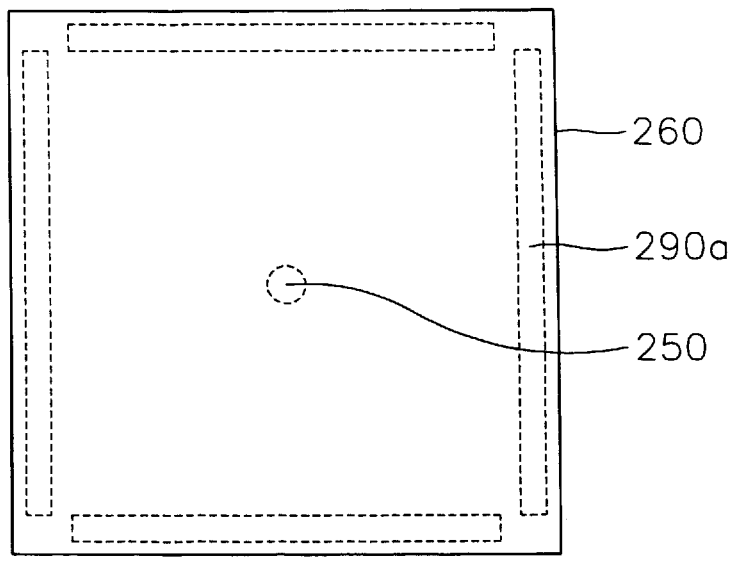
FIGS. 11A to 11D are magnified plan views of reflecting members and flatness enhancing members according to the second embodiment of the present invention.
Figure 11B:
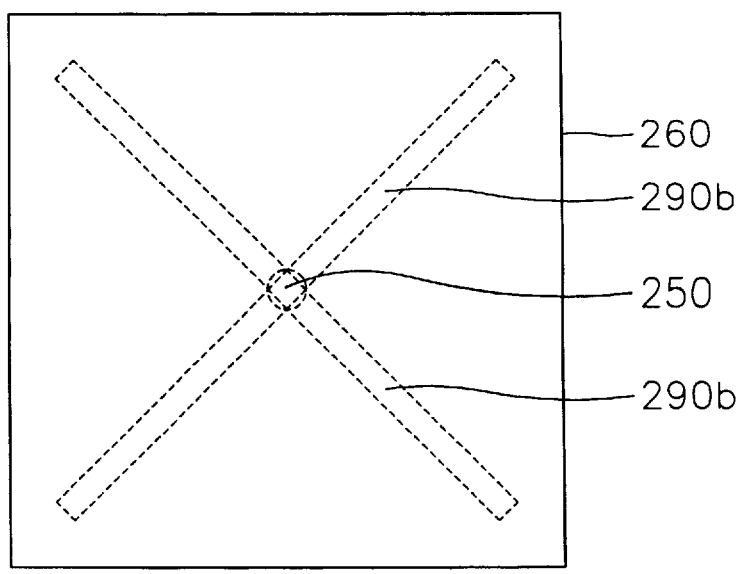
Figure 11C:
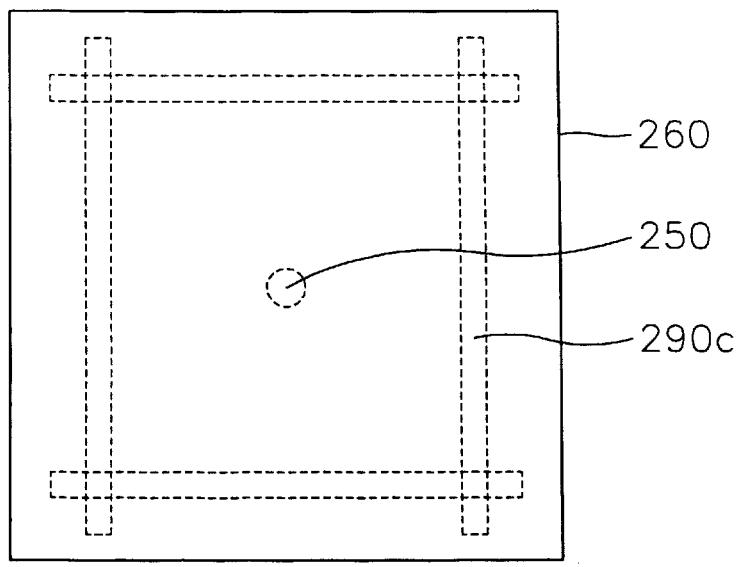
Figure 11D:
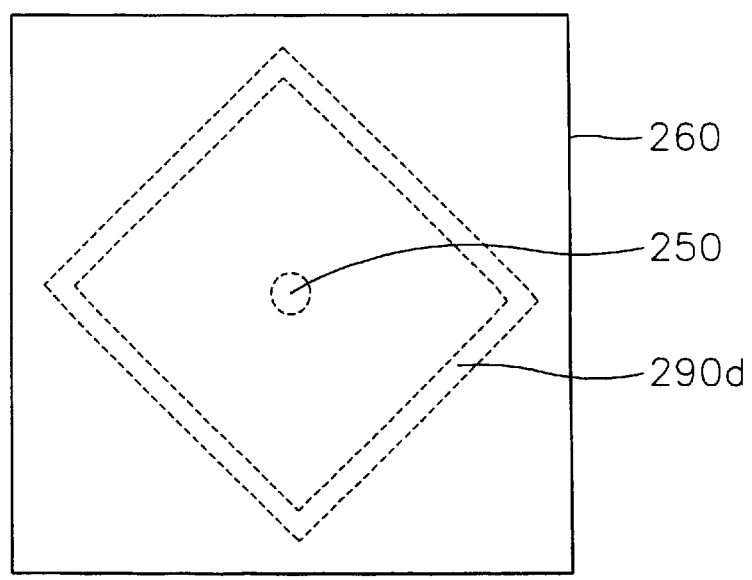

FIG. 10 is a plan view for showing a thin film actuated mirror array according to a second embodiment of the present invention and FIGS. 11A to 11D are magnified plan views of reflecting members and flatness enhancing members according to the second embodiment. In FIGS. 10 to 11D, the same reference numerals are used for the same elements is FIG. 5.

In the present embodiment, the construction and the manufacturing steps of the thin film AMA are the same as those of the first embodiment except stiffening members 290a, 290b, 290c, 290d which are formed beneath the reflecting member 260. Also, the operation of the thin film AMA according to the present embodiment is the same as that of the first embodiment. In the present embodiment, the flatness enhancing member is the stiffening members 290a, 290b, 290c, 290d.

Referring to FIGS. 10 and 11A, a stiffening member 290a is formed beneath peripheral portions of the reflecting member 260. The stiffening member 290a has the same function as the stress balancing layer of the first embodiment. The stiffening member 290a prevents the reflecting member 260 from bending upward or downward. The stiffening member 290a consists of four bars which are arranged in a rectangular shape. The stiffening member 290a is integrally formed with the reflecting member 260.

The manufacturing step of the stiffening member 290a will be described.

The stiffening member 290a is simultaneously formed with the post 250 and the reflecting member 260 after the second sacrificial layer 300 is patterned for forming the post 250 and the reflecting member 260. That is, the second sacrificial layer 300 is patterned to expose a portion of the supporting layer 170, and then the post 250, the stiffening member 290a and the reflecting member 260 are formed by patterning a metal layer after the metal layer having reflectivity such as aluminum, platinum, silver or aluminum alloy is formed on the exposed portion of the supporting layer 170 and on the patterned second sacrificial layer 300 by sputtering method or CVD method. In this case, the pattern of the second sacrificial layer 300 has a predetermined depth and has a shape of which four bars are arranged in a rectangular shape. The stiffening member 290a is formed on the pattern of the second sacrificial layer 300, so the stiffening member 290a has the same shape as that of the second sacrificial pattern.

For enhancing the flatness of the reflecting member 260, the stiffening member can have various shapes as shown in FIGS. 11B to 11D since the shape of the stiffening member is determined by the pattern of the second sacrificial layer 300. The stiffening member has a shape of an X (see FIG. 11B), a shape of a diamond (see FIG. 11C), or a shape of a sharp (see FIG. 11C).

In the thin film AMA according to the present invention, the flatness enhancing member such as the stress balancing layer or the stiffening member is formed beneath the reflecting member in order to enhance the flatness of the reflecting member without a bending of the reflecting member. Therefore, the reflecting member can have the level surface by the flatness enhancing member though the deformation stress such as residual stress is generated in the reflecting member during forming the reflecting member, so the light efficiency is enhanced and the quality of the picture projected onto the screen is increased.

Although preferred embodiments of the present invention have been described, it is understood that the present invention should not be limited to these preferred embodiments, but various changes and modifications can be made by one skilled in the art within the spirit and scope of the invention as hereinafter claimed.

What is claimed is:

1. A thin film actuated mirror array being actuated by a first signal and a second signal, said thin film actuated mirror array comprising:

an active matrix having a substrate including a metal oxide semiconductor transistor installed therein for a switching operation and a first metal layer having a drain pad prolonged from a drain of the metal oxide semiconductor for transmitting the first signal;

a supporting means having a supporting line formed above said active matrix, a supporting layer integrally formed with said supporting line and a plurality of anchors respectively formed between said active matrix and portions of said supporting layer adjacent to said supporting line;

a first actuating part having a first bottom electrode for receiving the first signal, said first bottom electrode being formed at a first portion of said supporting layer formed perpendicular to said supporting line, a first top electrode corresponding to said first bottom electrode for receiving the second signal and generating a first electric field, and a first active layer formed between said first bottom electrode and said first top electrode and deformed by the first electric field;

a second actuating part having a second bottom electrode for receiving the first signal, said second bottom electrode being formed at a second portion of said supporting layer formed perpendicular to said supporting line, a second top electrode corresponding to said second bottom electrode for receiving the second signal and generating a second electric field, and a second active layer formed between said second bottom electrode and said second top electrode and deformed by the second electric field;

a reflecting means for reflecting a light, said reflecting means being formed above said first actuating part and said second actuating part; and flatness enhancing means for enhancing a flatness of said reflecting means, said flatness enhancing means being formed beneath said reflecting means, said flatness enhancing means being a stress balancing layer formed beneath said reflecting means.

2. The thin film actuated mirror array as claimed in claim 1, said active matrix further comprising:

a first passivation layer formed on said first metal layer and on said substrate;

a second metal layer formed on said first passivation layer;

a second passivation layer formed on said second metal layer; and an etching stop layer formed on said second passivation layer.

3. The thin film actuated mirror array as claimed in claim 1, wherein said first bottom electrode has a reverse L-shape, said first active layer has a rectangular shape smaller than said first bottom electrode, said first top electrode has a rectangular shape smaller than said first active layer, said second bottom electrode has an L-shape corresponding to said first bottom electrode, said second active layer has a rectangular shape smaller than said second bottom electrode, and said second top electrode has a rectangular shape smaller than said second active layer.

4. The thin film actuated mirror array as claimed in claim 1, said thin film actuated mirror array further comprising:
   a via contact for transmitting the first signal from the drain pad to said first bottom electrode and to said second bottom electrode, said via contact being formed from the drain pad to said first bottom electrode and said second bottom electrode;
   a common line for transmitting the second signal, said common line being formed on said supporting line;
   a first insulating means formed from a portion of said first top electrode to a portion of said supporting layer through a portion of said first bottom electrode;
   a first top electrode connecting means formed from said common line to said first top electrode through said first insulating layer;
   a second insulating means formed from a portion of said second top electrode to a portion of said supporting layer through a portion of said second bottom electrode; and
   a second top electrode connecting means formed from said common line to said second top electrode through said second insulating layer.

5. The thin film actuated mirror array as claimed in claim 1, wherein said stress balancing layer is composed of a nitride.

6. A thin film actuated mirror array being actuated by a first signal and a second signal; said thin film actuated mirror array comprising:
   an active matrix having a substrate including a metal oxide semiconductor transistor installed therein for a switching operation and a first metal layer having a drain pad prolonged from a drain of the metal oxide semiconductor for transmitting the first signal;
   a supporting means having a supporting line formed above said active matrix; a supporting layer integrally formed with said supporting line and a plurality of anchors respectively formed between said active matrix and portions of said supporting layer adjacent to said supporting line;
   a first actuating part having a first bottom electrode for receiving the first signal, said first bottom electrode being formed at a first portion of said supporting layer formed perpendicular to said supporting line, a first top electrode corresponding to said first bottom electrode for receiving the second signal and generating a first electric field, and a first active layer formed between said first bottom electrode and said first top electrode and deformed by the first electric field;
   a second actuating part having a second bottom electrode for receiving the first signal, said second bottom electrode being formed at a second portion of said supporting layer formed perpendicular to said supporting line, a second top electrode corresponding to said second bottom electrode for receiving the second signal and generating a second electric field, and a second active layer formed between said second bottom electrode and said second top electrode and deformed by the second electric field;
   a reflecting means for reflecting a light, said reflecting means being formed above said first actuating part and said second actuating part; and
   a flatness enhancing means for enhancing a flatness of said reflecting means, said flatness enhancing means being formed beneath said reflecting means, said flatness enhancing means being a stiffening member formed beneath peripheral portions of said reflecting means.

7. The thin film actuated mirror array as claimed in claim 6, wherein said stiffening member is composed of the same metal of said reflecting means.

8. The thin film actuated mirror array as claimed in claim 6, wherein said stiffening member has a shape in which four bars are arranged in a rectangular shape.

9. The thin film actuated mirror array as claimed in claim 6, wherein said stiffening member has a shape of an X.

10. The thin film actuated mirror array as claimed in claim 6, wherein said stiffening member has a shape of a sign #.

11. The thin film actuated mirror array as claimed in claim 6, wherein said stiffening member has a shape of a diamond.

12. A thin film actuated mirror array being actuated by a first signal and a second signal, said thin film actuated mirror array comprising:
    an active matrix having a substrate including a metal oxide semiconductor transistor installed therein for a switching operation and a first metal layer having a drain pad prolonged from a drain of the metal oxide semiconductor for transmitting the first signal;
    a supporting means having a supporting line formed above said active matrix, a supporting layer integrally formed with said supporting line and a plurality of anchors respectively formed between said active matrix and portions of said supporting layer adjacent to said supporting line;
    a first actuating part having a first bottom electrode for receiving the first signal, said first bottom electrode being formed at a first portion of said supporting layer formed perpendicular to said supporting line, a first top electrode corresponding to said first bottom electrode for receiving the second signal and generating a first electric field, and a first active layer formed between said first bottom electrode and said first top electrode and deformed by the first electric field;
    a second actuating part having a second bottom electrode for receiving the first signal, said second bottom electrode being formed at a second portion of said supporting layer formed perpendicular to said supporting line, a second top electrode corresponding to said second bottom electrode for receiving the second signal and generating a second electric field, and a second active layer formed between said second bottom electrode and said second top electrode and deformed by the second electric field;
    a reflecting means for reflecting a light, said reflecting means being formed above said first actuating part and said second actuating part; and
    a stiffening member for enhancing a flatness of said reflecting means, said stiffening member being formed beneath peripheral portions of said reflecting means.

13. The thin film actuated mirror array as claimed in claim 12, wherein said stiffening member is composed of the same metal of said reflecting means.

14. The thin film actuated mirror array as claimed in claim 12, wherein said stiffening member has a shape in which four bars are arranged in a rectangular shape, a shape of an X, a shape of a sign #, or a shape of a diamond.

15. A method for manufacturing a thin film actuated mirror array comprising the steps of:
    i) providing an active matrix having a substrate including a metal oxide semiconductor therein for a switching operation, and a first metal layer including a drain pad prolonged from a drain of the metal oxide transistor;

ii) forming a first sacrificial layer on said active matrix and patterning said first sacrificial layer;

iii) forming a first layer, a bottom electrode layer, a second layer, and a top electrode layer on said patterned first sacrificial layer one after another;

iv) forming a first actuating part including a first bottom electrode, a first active layer and a first top electrode, and a second actuating part including a second bottom electrode, a second active layer and a second top electrode by patterning said top electrode layer, by patterning said second layer, and by patterning said bottom electrode layer;

v) forming a supporting means having a supporting line, a supporting layer, and a plurality of anchors by patterning said first layer;

vi) forming a common line on said supporting line;

vii) forming a second sacrificial layer on said first actuating part, on said second actuating part and on said supporting means, and patterning said second sacrificial layer;

viii) forming a flatness enhancing means on said patterned second sacrificial layer; and ix) forming a reflecting means on said flatness enhancing means, wherein step viii) and step ix) are simultaneously performed, and said patterned second sacrificial layer has a shape in which four bars are arranged in a rectangular shape, a shape of an X, a shape of a sign # or a shape of a diamond after patterning said second sacrificial layer.

16. The method for manufacturing the thin film actuated mirror array as claimed in claim 15, said method further comprising:

forming a first passivation layer, a second metal layer, a second passivation layer, an etching stop layer on said active matrix one after another;

forming a first insulating means from a portion of said first top electrode to a portion of said supporting layer;

forming a first top electrode connecting means from said common line to said first top electrode through said first insulating layer;

forming a second insulating means from a portion of said second top electrode to a portion of said supporting layer;

forming a second top electrode connecting means from said common line to said second top electrode through said second insulating layer; and forming a via contact from the drain pad to said first bottom electrode and to said second bottom electrode.

17. The method for manufacturing the thin film actuated mirror array as claimed in claim 15, wherein the step viii) is performed by using a nitride and by a plasma enhanced chemical vapor deposition method.

* * * * *